(12) United States Patent  
Nakayama et al.

(10) Patent No.: US 8,980,467 B2  
(45) Date of Patent: Mar. 17, 2015

(54) STORAGE BATTERY

(75) Inventors: Yasuhide Nakayama, Kyoto (JP); Eiji Hojo, Kyoto (JP); Hirofumi Umetani, Kyoto (JP); Masashi Shiota, Kyoto (JP); Shin Ohsaki, Kyoto (JP); Shinichi Egami, Kyoto (JP)

(73) Assignee: GS Yuasa International, Ltd., Kyoto (JP)

( * ) Notice: Subject to any disclaimer, the term of this patent is extended or adjusted under 35 U.S.C. 154(b) by 458 days.

(21) Appl. No.: 12/988,750

(22) PCT Filed: Apr. 24, 2009

(86) PCT No.: PCT/JP2009/058214  
§ 371 (c)(1),  
(2), (4) Date: Oct. 20, 2010

(87) PCT Pub. No.: WO2009/131228  
PCT Pub. Date: Oct. 29, 2009

(65) Prior Publication Data  
US 2011/0039153 A1  Feb. 17, 2011

(30) Foreign Application Priority Data

Apr. 25, 2008 (JP) ................................. 2008-114940  
Jul. 31, 2008 (JP) ................................. 2008-197378  
Aug. 8, 2008 (JP) ................................. 2008-206416  
Aug. 8, 2008 (JP) ................................. 2008-206417

(51) Int. Cl.  
*H01M 2/02* (2006.01)  
*H01M 2/12* (2006.01)  
(Continued)

(52) U.S. Cl.  
CPC .............. *H01M 2/305* (2013.01); *H01M 2/043* (2013.01); *H01M 2/06* (2013.01); *H01M 2/1252* (2013.01)  
USPC ........................................... 429/181; 429/84

(58) Field of Classification Search  
CPC ........................... H01M 2/1252; H01M 2/043  
USPC ....................................................... 429/181  
See application file for complete search history.

(56) References Cited

U.S. PATENT DOCUMENTS 4,278,742 A   7/1981  Bush et al.  
5,135,822 A *  8/1992  Okamoto ........................ 429/97  
(Continued)

FOREIGN PATENT DOCUMENTS

JP   HEI0727053    5/1995  
JP   9-237615      9/1997  
(Continued)

OTHER PUBLICATIONS

European Search Report issued Feb. 7, 2014 in connection with related European Patent Appl. No. 09804957.0.  
(Continued)

*Primary Examiner* — Maria J Laios  
(74) *Attorney, Agent, or Firm* — Berliner & Associates

(57) ABSTRACT

There is provided a storage battery, including: a container having at least one cell chamber; a lid body (2) made of synthetic resin for covering a top opening of the container, the lid body having on a top surface a recessed portion that is recessed downward, the lid body having positive and negative electrode terminals disposed close to one side of the lid body and respectively at both end portions of said one side in a longitudinal direction, wherein the positive and negative electrode terminals (4) respectively have lower portions embedded in the lid body and upper portions projecting from the lid body; and an auxiliary lid (9) for closing the recessed portion. Conventional production of the storage battery has problems, for example, in that: when embedding a portion of a terminal to a lid body by insert molding, difference in shrinkage is caused between a surface in which a terminal body is embedded and a surface on which the terminal body is exposed, which results in difficulty in fitting the lid body to the container. The present invention is intended to solve this problem, for example, by providing the lid body of the storage battery with projections (6T, 7T), each at a location at which the upper portion of each of the terminals projects, at a location proximate to the location at which the upper portion of each of the terminals 4 projects, or at each of these locations.

12 Claims, 19 Drawing Sheets

(51) Int. Cl.
*H01M 2/30* (2006.01)
*H01M 2/04* (2006.01)
*H01M 2/06* (2006.01)

(56) References Cited

U.S. PATENT DOCUMENTS

| | | | |
|---|---|---|---|
| 5,498,488 A | 3/1996 | Stocchiero | |
| 5,843,593 A | 12/1998 | Fritts et al. | |
| 2002/0114994 A1 | 8/2002 | Yabuki et al. | |
| 2003/0017387 A1 | 1/2003 | Marukawa et al. | |
| 2004/0079738 A1 | 4/2004 | Sakamoto et al. | |
| 2010/0297478 A1* | 11/2010 | Mashiko et al. | 429/7 |

FOREIGN PATENT DOCUMENTS

| | | |
|---|---|---|
| JP | H09231951 A | 9/1997 |
| JP | 2001084981 | 3/2001 |
| JP | 2001236937 | 8/2001 |
| JP | 2003-77454 | 9/2001 |
| JP | 2002313315 A | 10/2002 |
| JP | 2002324537 | 11/2002 |
| JP | 2003-36830 | 2/2003 |
| JP | 2003-132856 | 5/2003 |
| JP | 2003142072 A | 5/2003 |
| JP | 2003162990 | 6/2003 |
| JP | 2004-235050 | 8/2004 |
| JP | 2005044711 A | 2/2005 |
| JP | 2009-43441 | 8/2007 |
| JP | 2008034168 | 2/2008 |
| JP | 2008034291 A | 2/2008 |
| JP | 2008117583 | 5/2008 |
| WO | WO 2008/016152 A1 | 2/2008 |

OTHER PUBLICATIONS

European Search Report issued Jan. 24, 2014 in connection with related European Patent Appl. No. 09735187.8.

* cited by examiner

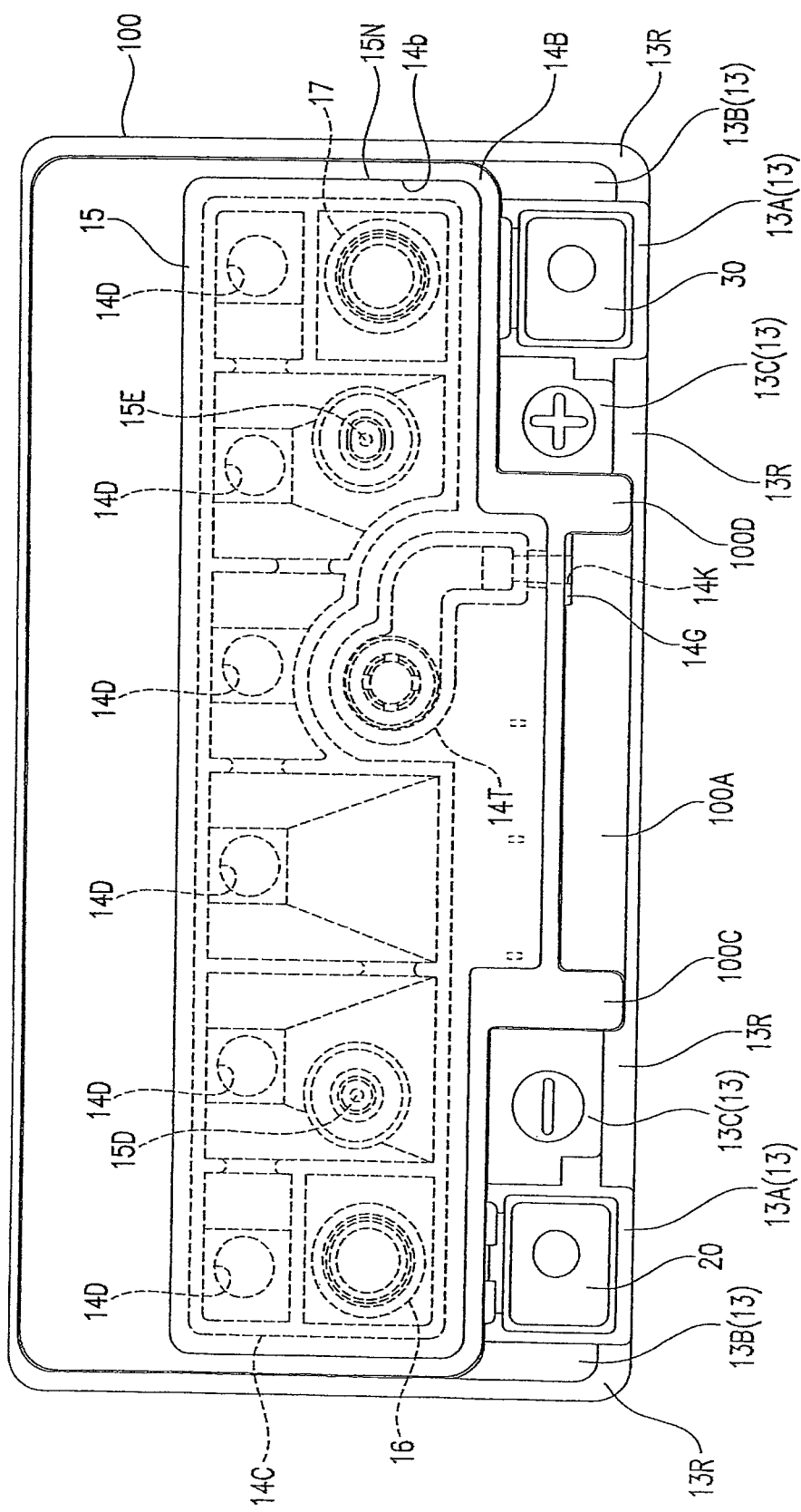

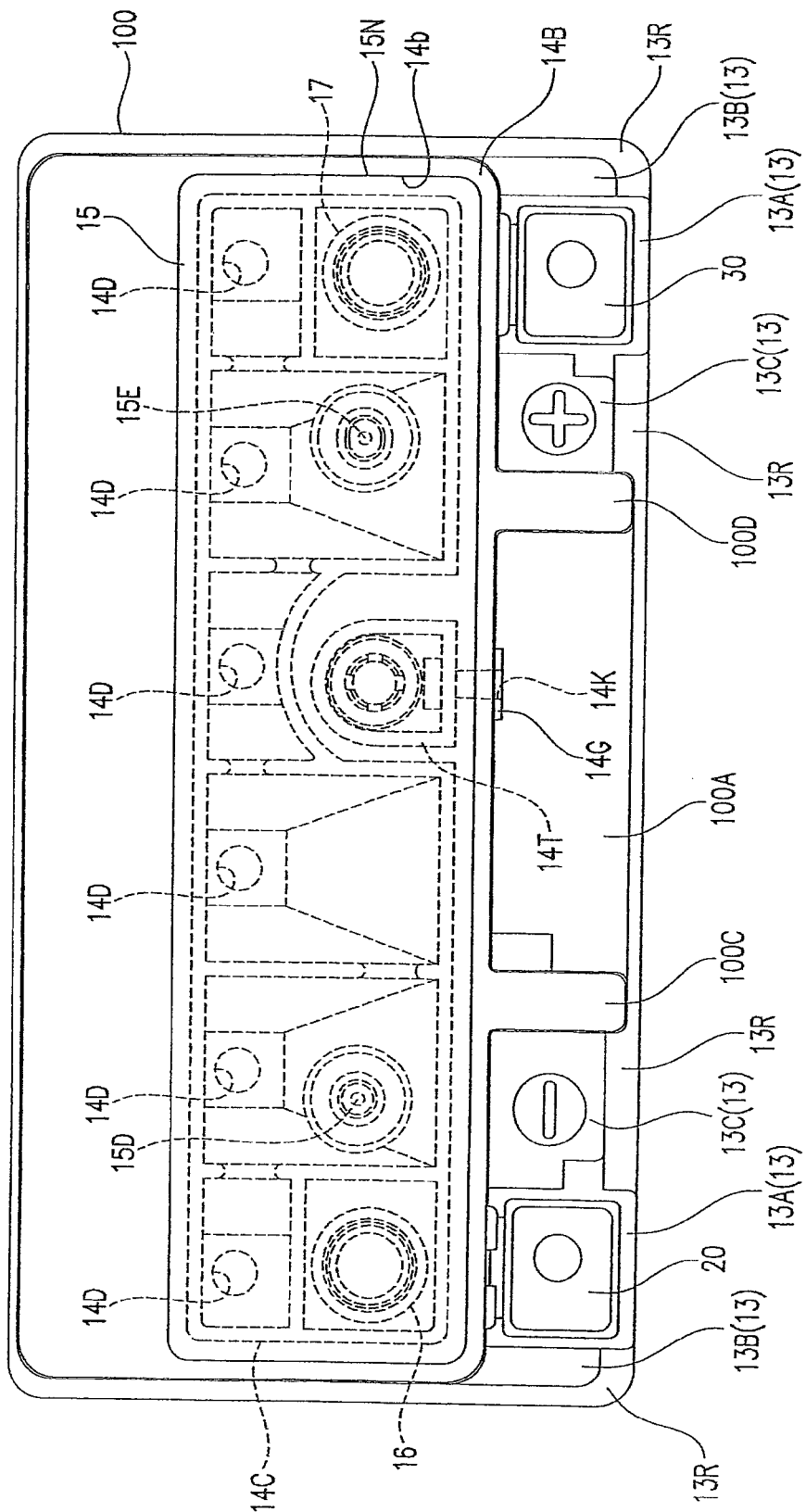

STORAGE BATTERY

TECHNICAL FIELD

The present invention relates to a storage battery, and more particularly to a storage battery suitable for use in vehicles such as motorcycles and automobiles.

BACKGROUND ART

An example of the storage battery includes: a container having a cell chamber; a lid body made of synthetic resin for covering a top opening of the container; electrode plates housed in the cell chamber; an electrode pole extending from the electrode plates; a bushing, to which the electrode pole is inserted and welded, provided in the lid body; and a plate terminal on a cutout formed on a portion of the top surface of the lid body, the terminal plate being connected to the bushing (cf. Patent Document 1, for example).

PRIOR ART DOCUMENT

Patent Document

Patent Document 1: Japanese Patent Application Laid-open No. 2003-77454 (cf. FIGS. 2-4)
Patent Document 2: Japanese Patent Application Laid-open No. 2009-43441 (cf. FIG. 3).

SUMMARY OF THE INVENTION

Problems to be Solved by the Invention

The storage battery with the structure disclosed in the above Patent Document 1 has a problem of increased man-hours required for production. That is, work is required for welding an electrode pole to a bushing as well as for fitting and securing a vertical plate portion on one side of a plate terminal, to a recessed portion provided on the top surface of a lid, and for fitting and welding a bushing to a through-hole in a horizontal plate portion on another side of the plate terminal.

To address this issue, the Applicant has proposed a lid structure, in which a bushing and a terminal are provided in a lid body, a conductive part for connecting the terminal to the bushing is formed integrally with the terminal and the bushing so as to form a terminal body, and a portion of the terminal body is embedded into the lid by insert molding (cf. Patent Document 2, for example).

However, the structure disclosed in the Patent Document 2 encounters a problem in that, when temperature decreases from the high temperature state right after insert molding, difference in shrinkage is caused between the back surface of the lid with the terminal body embedded therein and the front surface of the lid with the terminal body exposed thereon, and such difference in shrinkage, in turn, causes the front surface of the lid to be convexly deformed and the back surface of the lid to be concavely deformed, which results in difficulty in fitting the lid to the container.

In view of the aforementioned situation, it is an object of the present invention to facilitate smooth production of storage batteries by preventing or reducing deformation of a lid body having a terminal body insert molded thereto.

Means to Solve the Problem

In order to solve the aforementioned problem, the present invention provides a storage battery, including: a container having at least one cell chamber; a lid body made of synthetic resin for covering a top opening of the container, the lid body having on a top surface a recessed portion that is recessed downward, the lid body having positive and negative electrode terminals disposed close to one side of the lid body and respectively at both end portions of said one side in a longitudinal direction, wherein the positive and negative electrode terminals respectively have lower portions embedded in the lid body and upper portions projecting from the lid body; and a lid body cover for closing the recessed portion, wherein the lid body has a projection formed at a location at which the upper portion of each of the terminals projects, at a location proximate to the location at which the upper portion of each of the terminals projects, or at each of these locations.

As described above, by providing a projection at a location at which the upper portion of each of the terminals projects, at a location proximate to the location at which the upper portion of each of the terminals projects, or at each of these locations, it is possible to prevent or reduce deformation of the lid body caused by temperature decrease after insert molding, i.e., concave deformation of a resin portion of the inside of the lid body in which the terminal body is embedded and convex deformation of a resin portion of the outside of the lid body on which the terminal body is exposed.

In the storage battery according to the present invention, it is possible to employ an arrangement where electrode plates are housed in the cell chamber, and the lid body has bushings to which electrode poles extending from the electrode plates are respectively inserted and welded; the terminals; and conductive parts for each connecting the corresponding terminal with the corresponding bushing, the conductive parts each being integrated with the corresponding bushing and the corresponding terminal to form a terminal body, and wherein at least the lower portion of each of the bushings and each of the conductive parts are embedded in the lid body by insert molding.

In the case where the lower portion of the bushing and the conductive part of the terminal body are embedded in the lid body by insert molding as described above, the lid body is more likely to be subjected to deformation caused by temperature decrease after the insert molding; that is, the resin portion of the inside of the lid body in which the terminal body is embedded is more likely to be concavely deformed and the resin portion of the outside of the lid body on which the terminal body is exposed is more likely to be convexly deformed. However, by providing the projection of claim 1, it is possible to prevent or reduce the deformation.

The end of the electrode pole welded to the bushing and the end of the bushing embedded in the lid body may be covered with synthetic resin attached thereto.

By providing the projection of claim 1, insert molding of the conductive part and the lower portion of the terminal to the lid body can be performed without deformation of the lid body. In addition to this, by attaching the synthetic resin, it is possible to prevent external leakage of electrolyte creeping upward along the interface of the bushing even if a fine clearance is formed between the electrode pole and the bushing as a result of shrinkage of the lid body (caused, for example, by temperature decrease after the welding) after the electrode pole is inserted and welded to the bushing.

The lid body cover for closing the recessed portion in the top surface of the lid body may have a rib on its back surface and the lid body may have on its top surface a rib provided in such a manner as to oppose the rib of the lid body cover and surround a part or a whole of the periphery of each of the bushings.

By providing the projections of claim 1, insert molding of the conductive part and the lower portion of the terminal to the lid body can be performed without deformation of the lid body. In addition to this, joining of the rib on the back surface of the lid body cover and the rib on the top surface of the lid body can be performed without forming a clearance, thereby preventing electrolyte from flowing upward through the clearance between the electrode pole and the bushing and moving to the top surface of the lid body where a filling port is provided.

The bushing may be of a tapered shape having an inner diameter of the upper portion smaller than that of the lower portion, and the electrode pole may be of a tapered shape having an outer diameter of the lower end larger than that of the upper end.

By providing the projection of claim 1, insert molding of the conductive part and the lower portion of the terminal to the lid body can be performed without deformation of the lid body. In addition to this, by forming the bushing to be of a tapered shape having an inner diameter of the upper portion smaller than that of the lower portion and forming the electrode pole to be of a tapered shape having an outer diameter of the lower end larger than that of the upper end, insertion of the electrode pole into the bushing can be easily performed, and what is more, misalignment, which may occur when inserting the electrode pole into the bushing, can be prevented from easily occurring. This results in a smaller clearance between the upper portion of the bushing and the electrode pole to thereby increase ease in welding the electrode pole thereto, and this can prevent electrolyte from flowing upward along the surface of the electrode pole and moving into the space from the upper portion of the bushing. In addition, the aforementioned effect of preventing or reducing deformation enables smooth insertion of the electrode pole into the bushing.

One of the lid body and the lid body cover may have to-be-locked portions and the other may have locking portions that come into locking engagement with the to-be-locked portions. The to-be-locked portions may comprise a pair of holes, one of the pair of holes being sized to block horizontal movement of the locking portion that comes into locking engagement with the hole, the other of the pair of holes being shaped into a long hole that extends in the direction in which the pair of holes oppose each other.

According to the aforementioned structure, when attaching the lid body cover to the lid body, a pair of locking portions is brought into locking engagement with the pair of holes, and from the locking engagement state, the lid body and the lid cover body are moved close to each other so as to complete the attachment of the lid body cover to the lid body. Because the other of the pair of holes is shaped into a long hole extending in the direction in which the pair of holes oppose each other, even when positioning of the lid body cover and the lid body is difficult due to the difference in shrinkage after molding, temperature change after molding, variation with time or the like, the long hole can favorably absorb the change or the variation. In this case, the distance between the pair of locking portions in the direction in which they oppose each other is subject to change, whereas the positional relationship between the pair of locking portions remains unchanged with respect to the direction orthogonal to the pair of locking portions opposing direction. Because of this, by shaping the other of the pair of holes into a long hole extending in the direction in which the pair of holes oppose each other, it is possible to stably position the pair of locking portions in terms of the direction orthogonal to the direction in which the pair of locking portions oppose each other, and at the same time, allow the long hole, which extends in the direction in which the pair of locking portions oppose each other and is provided only for one of the pair of the to-be-locked portions, to absorb the expansion and shrinkage of the lid body cover. As a manner to join the projecting portions of the lid body together with the joining portions of the lid body cover to integrate them, adhesive agents as well as thermal bonding may be employed. By providing the projection of claim 1, insert molding of the conductive part and the lower portion of the terminal to the lid body can be performed without deformation of the lid body. Even if the lid body is deformed due to difference in manufacturing environment, e.g., room temperature and other causes, by shaping the other of the pair of holes into a long hole extending in the direction in which the pair of holes oppose each other, smooth attachment of the lid body cover to the lid body can be achieved.

The projection may include: a first projecting portion disposed in a periphery of the location at which the upper portion of the corresponding terminal projects; and second and third projecting portions disposed in proximity to the first projecting portion, at both sides of the first projecting portion in the longitudinal direction, and projecting upward of the first projecting portion, wherein the terminal may have, in its side end close to the second projecting portion or in its side end close to the third projecting portion, an opening for inserting a nut, and a bottom surface of the opening may be positioned lower than the top surface of the second or third projecting portion.

As described above, by providing a first projecting portion for each of the terminals, it is possible to prevent or reduce convex deformation of the top surface of the lid body in which the lower portion of the terminal is embedded, and concave deformation of the back surface thereof. What is more, by providing each of the terminal, in its side end close to the second projecting portion or in its side end close to the third projecting portion, with an opening for inserting a nut, and by positioning the bottom surface of the opening lower than the top surface of the second or third projecting portion, it is possible to prevent the inserted nut from falling off, as well as avoiding the problem of difficulty in inserting the nut caused by the deformation, in the case where the nut is inserted by placing it on a top surface of the second or third projecting portion and sliding it down into the terminal through the opening.

The conductive part of at least one of the terminal bodies may have a synthetic resin layer covered thereon, which is formed by insert molding, in such a manner as to be partly omitted or partly thinner than in other portions.

In the case where the conductive part has a synthetic resin layer that is partly omitted or is partly thinner than in other portions as described above, problems such as an internal short-circuit can be prevented because, even if an excess current keeps running and causes the conductive part to generate heat and soften the portion where the synthetic resin layer is omitted or thinner, the constituent material of the conductive part flows down outside from the softened portion and does not flow down into the storage battery. In addition, since the portion of the conductive part where the synthetic resin layer is omitted or is thinner cools more easily than the remaining portions, deformation of the lid body is small compared to the case where the entire conductive part is covered with synthetic resin in such a manner that the thickness thereof is uniform in its entirety. With this, deformation of the lid body can further be reduced, coupled with the effect produced by the projection provided according to claim 1.

The conductive part may further include at least one of an annular projecting portion that projects outward, an annular depressed portion and a portion whose cross sectional area is smaller than the other portions.

In the case where the conductive part includes at least one of an annular projecting portion that projects outward, an annular depressed portion and a portion whose cross sectional area is smaller than the other portions, it is possible to prevent electrolyte from easily moving to the terminal through the interface of the bushing. Moreover, in the case where the conductive part includes an annular depressed portion or a portion whose cross sectional area is smaller than the other portions, when an excess current flow is caused by a short-circuit, the conductive part can be molten down at an early stage by the depressed portion or the portion whose cross sectional area is smaller. In addition, if the conductive part after insert molding has a depressed portion or a portion whose cross sectional area is smaller, these portions absorb distortion so as to reduce deformation of the lid body. With this, the deformation of the lid body can further be reduced, coupled with the effect produced by the projection provided according to claim 1.

Advantages of the Invention

By providing a projection at a location at which the upper portion of each of the terminals projects, at a location proximate to the location at which the upper portion of each of the terminals projects, or at each of these locations, it is possible to prevent or reduce deformation of the lid body caused by temperature decrease after insert molding, i.e., concave deformation of the resin portion of the inside of the lid body in which the terminal body is embedded and convex deformation of the resin portion of the outside of the lid body on which the terminal body is exposed. As such, smooth production of storage batteries is possible by reducing deformation of a lid body to which a terminal body is insert molded.

BRIEF DESCRIPTION OF THE DRAWING

FIG. 9 show the terminal body, in which

FIG. 13 show the lid body of FIG. 10, in which

FIG. 16 show the lid body cover of FIG. 10, in which

FIG. 18 is a plane view of a lid body according to a sixth embodiment.

FIG. 19 is a plane view of a lid body according to a seventh embodiment.

BEST MODE FOR CARRYING OUT THE INVENTION

The present invention is described below in accordance with its preferred embodiments.

Figure 1:
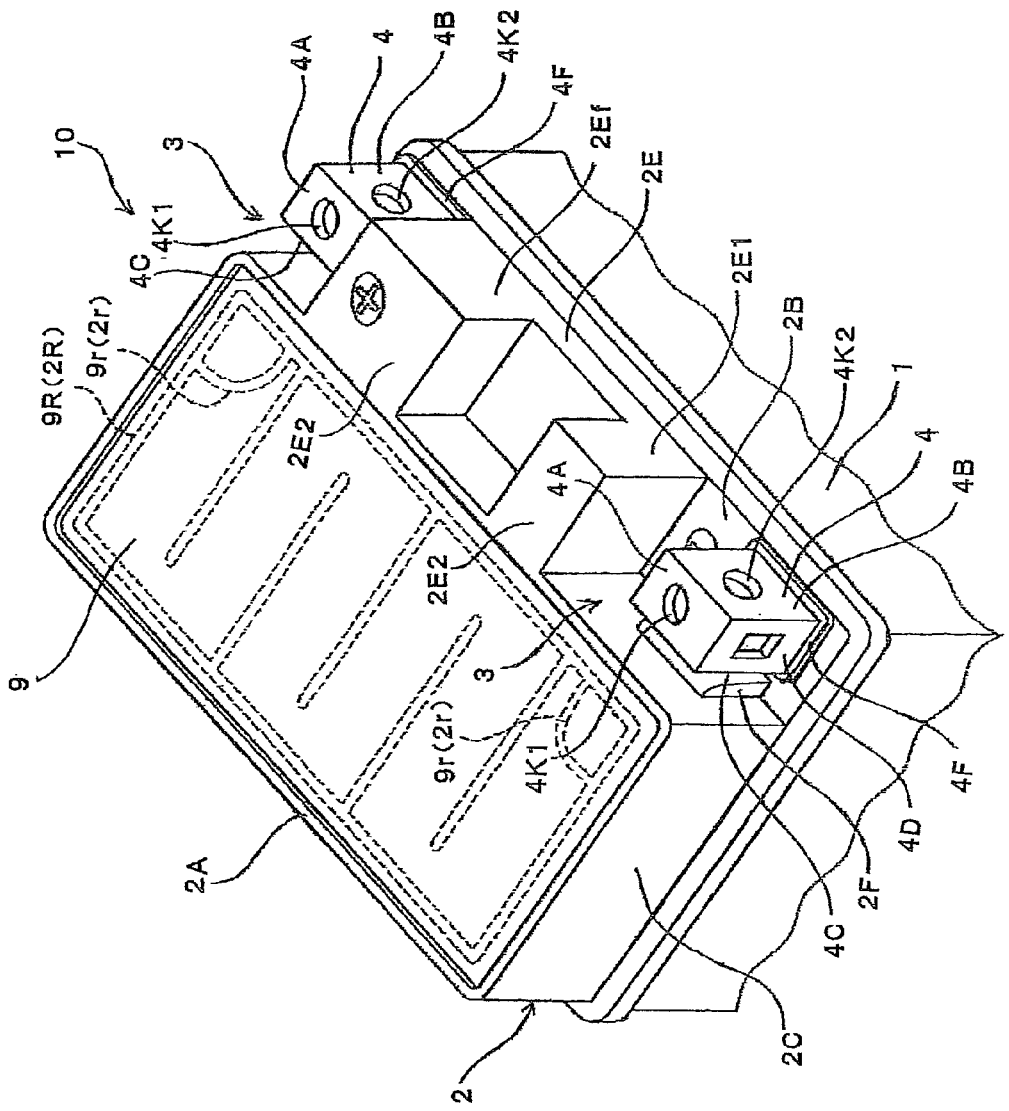
FIG. 1 is a perspective view showing the top surface of a storage battery according to a fifth embodiment of the present invention.
Figure 6:
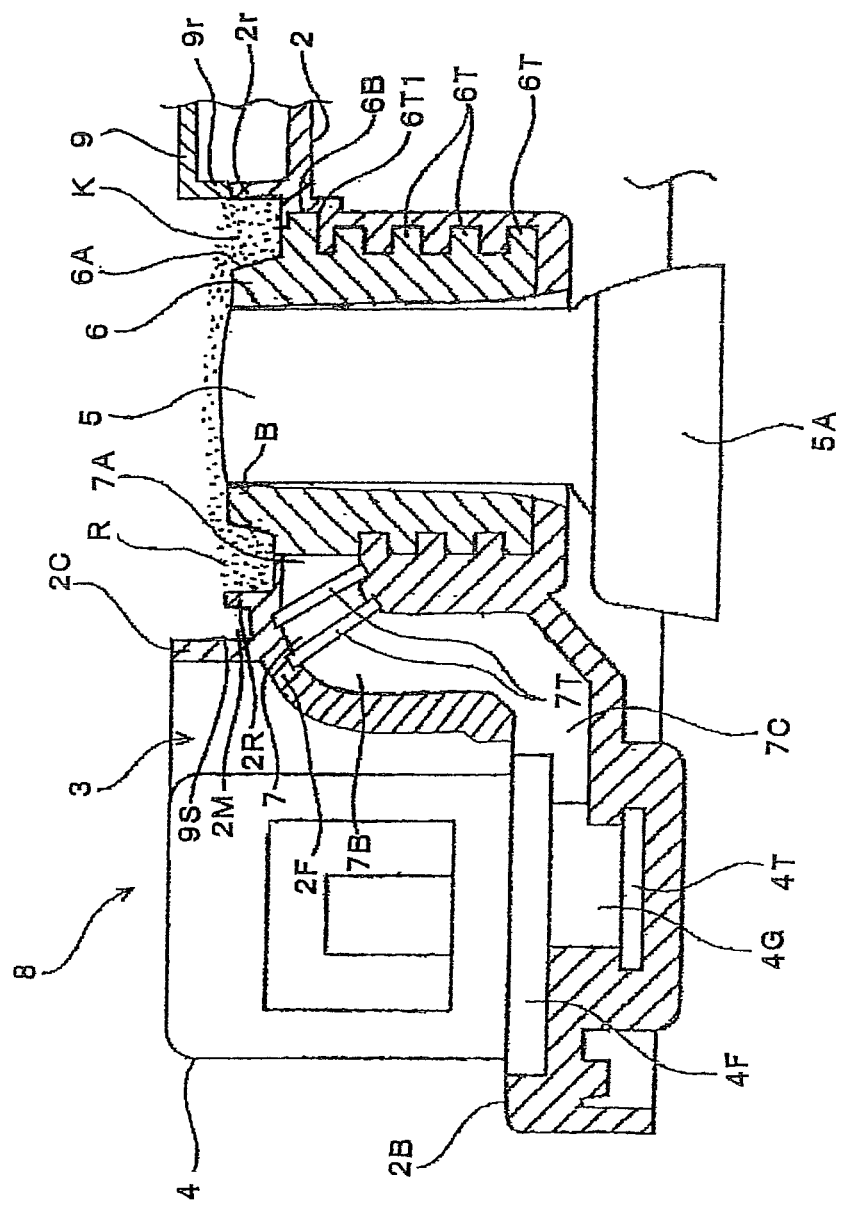
FIG. 6 is a cross sectional view of an essential portion of a terminal body of a storage battery after an auxiliary lid is attached, according to a forth embodiment.

FIG. 1 shows a perspective view of an essential portion of a lead-acid storage battery (hereinafter, simply referred to as a "storage battery") particularly suitable for use in motorcycles, but this is not meant to preclude the use of the storage battery for other purposes. As shown in FIG. 1, a storage battery 10 (the fifth embodiment) includes: a container 1 made of synthetic resin having a rectangular shape as viewed in plane; a lid 2 (corresponding to a lid body 100 in FIGS. 10-19) made of synthetic resin having a rectangular shape as viewed in plane for closing a top opening of the container 1; and an auxiliary lid 9 made of synthetic resin having a rectangular shape as viewed in plane for covering an upper surface of the lid 2. As described below (as shown in FIG. 6), the storage battery 10 may be configured such that the auxiliary lid 9 is not located on a portion of the lid 2 coated with synthetic resin R covering an end of a bushing 6 that is embedded in the lid 2.

Of the four corners of the lid 2, two corners at the opposite ends of one of the longitudinal sides are provided respectively with cutouts 3, 3, in which terminals 4, 4, which constitute positive and negative electrodes, are respectively disposed (in FIG. 1, a positive terminal is on the right and a negative terminal on the left), and top plates 4A, 4A of the terminals 4, 4 are dimensioned or sized so as not to protrude away from an upper end 2A of the lid 2. Further, the lid 2 has a recess and projection 2E such that a front surface 2E1 thereof protrudes forward of front plates 4B, 4B of the terminals 4, 4 and a top surface 2E2 protrudes upward of the top plates 4A, 4A of the terminals 4, 4 so as to prevent a short-circuit from being caused due to bridging by a metallic piece between the terminals 4, 4.

Figure 2:
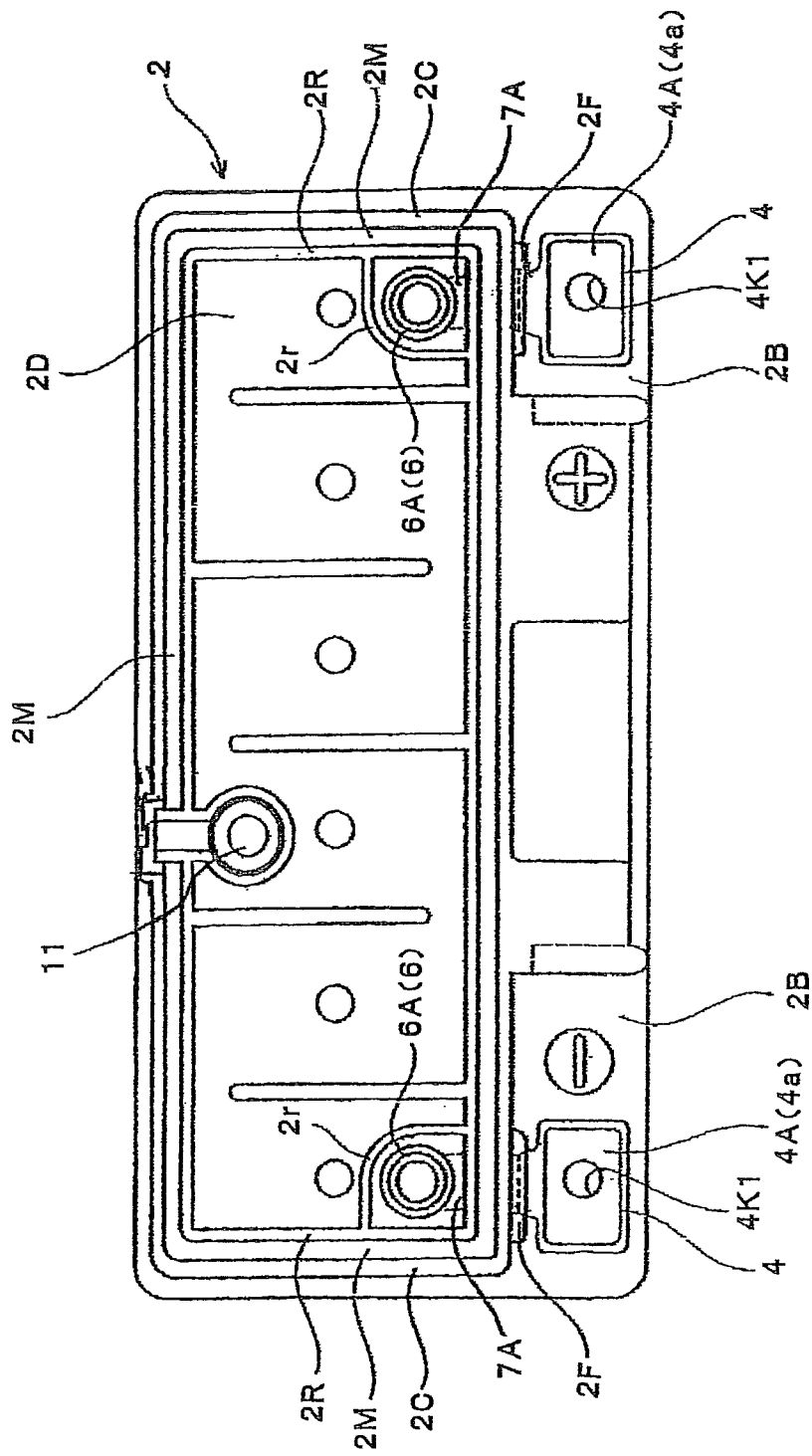
FIG. 2 is a plane view of the storage battery before an auxiliary lid is attached.
Figure 3:
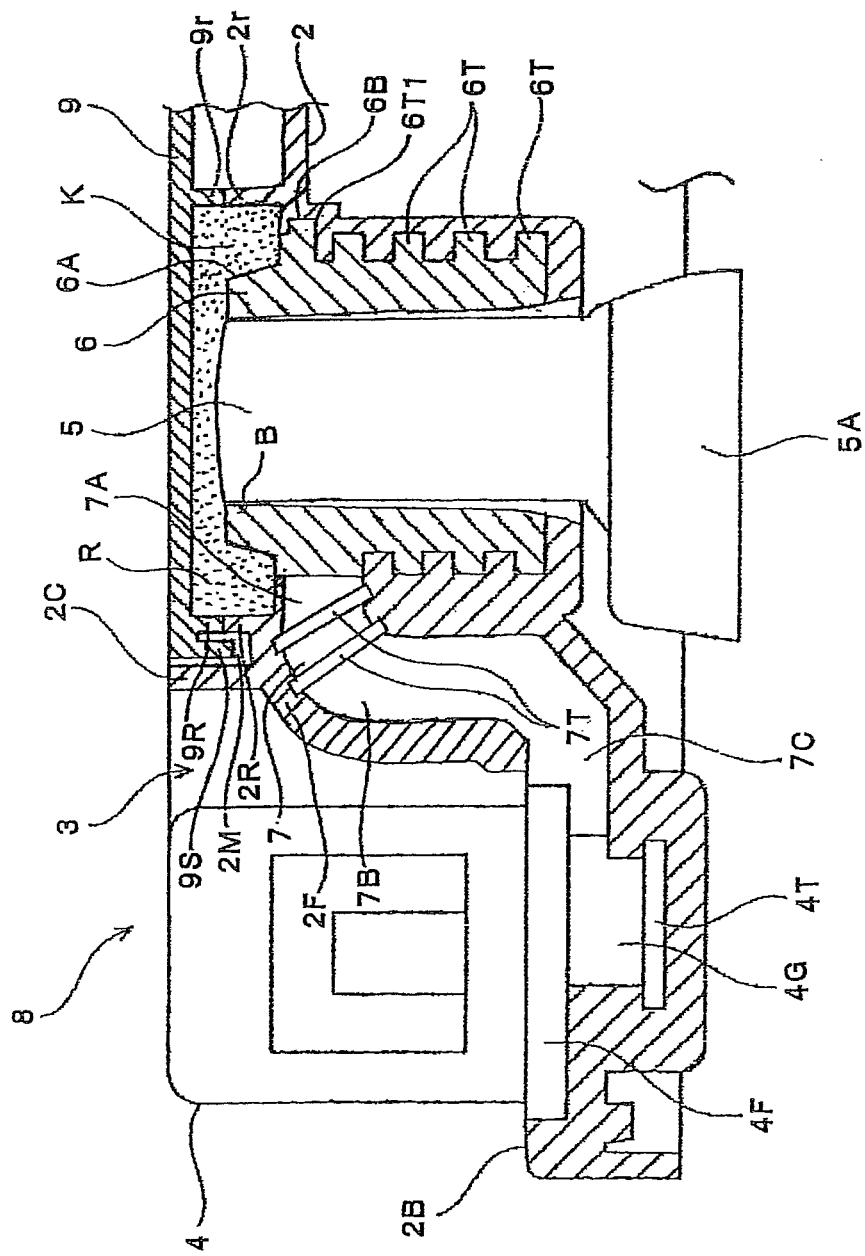
FIG. 3 is a cross sectional view of an essential portion of a terminal body of the storage battery after the auxiliary lid is attached.

To illustrate a plane shape of the lid 2, FIG. 2 shows a plane view of the storage battery of FIG. 1 in which the auxiliary lid 9 is removed. To describe the structure of the terminals 4, 4 inside the lid 2, FIG. 3 shows a cross sectional view of a portion that includes one of the terminals 4, 4 (while an exhaust valve is shown with a reference numeral 11 in FIG. 2, it is omitted in FIG. 1). These Figures show that each bushing 6, to which an electrode pole 15 extending from electrode plates (not shown) is inserted and welded, is insert molded at each end of a longitudinal side of the top plate 2D of the lid 2, together with the conductive part 7 that is connected to an upper portion 6A of the bushing 6 in a bottom portion 4F and a connecting portion 4G of the terminal 4. The conductive part 7 for connecting the terminal 4 to the bushing 6 is formed integrally with the terminal 4 and the bushing 6 by lead or lead alloy to form a terminal body 8. A reference code 5A in FIG. 3 represents a strap for integrating together plural positive electrode plates or plural negative electrode plates that constitute electrode plates (not shown), so as to be connected to the lower end of the positive or negative electrode pole 5. A reference code B in FIG. 3 represents a portion where the bushing 6 and the electrode pole 5 are welded with a burner or the like.

A reference numeral 9 in FIGS. 1 and 3 represents an auxiliary lid, which has a rectangular shape and is placed on the lid 2 in such a manner as to cover the upper portion 6A of the bushing 6 and the electrode pole 5 that are exposed on the top plate 2D of the lid 2. As shown in FIGS. 1-3, the top plate 2D of the lid 2 is positioned slightly lower than the upper end 2A of a vertical plate portion 2C, which has a rectangular shape as viewed in plane and stands upright from the bottom surface 2B. On the outer periphery of the top surface, an annular rib 2R is formed to be approximately parallel to the vertical plate portion 2C, and the rib 2R forms a circular arc portion 2r, surrounding the exposed portions of the upper portion 6A of the bushing 6 and the electrode pole 5.

The auxiliary lid 9, as shown in FIG. 3, has a skirt 9S provided in its outer periphery. The skirt 9S is fitted to a groove 2M provided between the rib 2R and the vertical plate portion 2C, then, a rib 9R and a circular arc portion 9r, which are provided corresponding in location to the rib 2R and the circular arc portion 2r, are held in abutment with the rib 2R and the circular arc portion 2r under molten state and welded to the same, thereby putting an inside space K surrounded by the rib 2R and the circular arc portion 2r, and the rib 9R and the circular arc portion 9r, in a hermetically sealed state. The circular arc portion 2r and the circular arc portion 9r may not necessarily have a circular arc shape.

Furthermore, of the terminal body 8, the lower portion 6B of the bushing 6 excluding the upper portion 6A of the bushing 6 and the conductive part 7, are embedded in the lid 2 by insert molding as shown in FIG. 3. The conductive part 7 includes: a first horizontal plate portion 7A extending in a horizontal direction from the lower portion 6B of the bushing 6; a vertical plate portion 7B extending downward from an end of the first horizontal plate portion 7A; and a second horizontal plate portion 7C extending in a horizontal direction from the lower end of the vertical plate portion 7B to be connected to the bottom portion 4F and the connecting portion 4G of the terminal 4. The bushing 6 has plural annular projecting portions 6T provided outside of the lower portion 6B along the vertical direction, and the first horizontal plate portion 7A of the conductive part 7 has projecting portion 7T. This structure can prevent electrolyte from moving into the space K in the upper portion of the lid 2, as well as electrolyte that has moved from reaching the terminals 4, 4.

Figure 10:
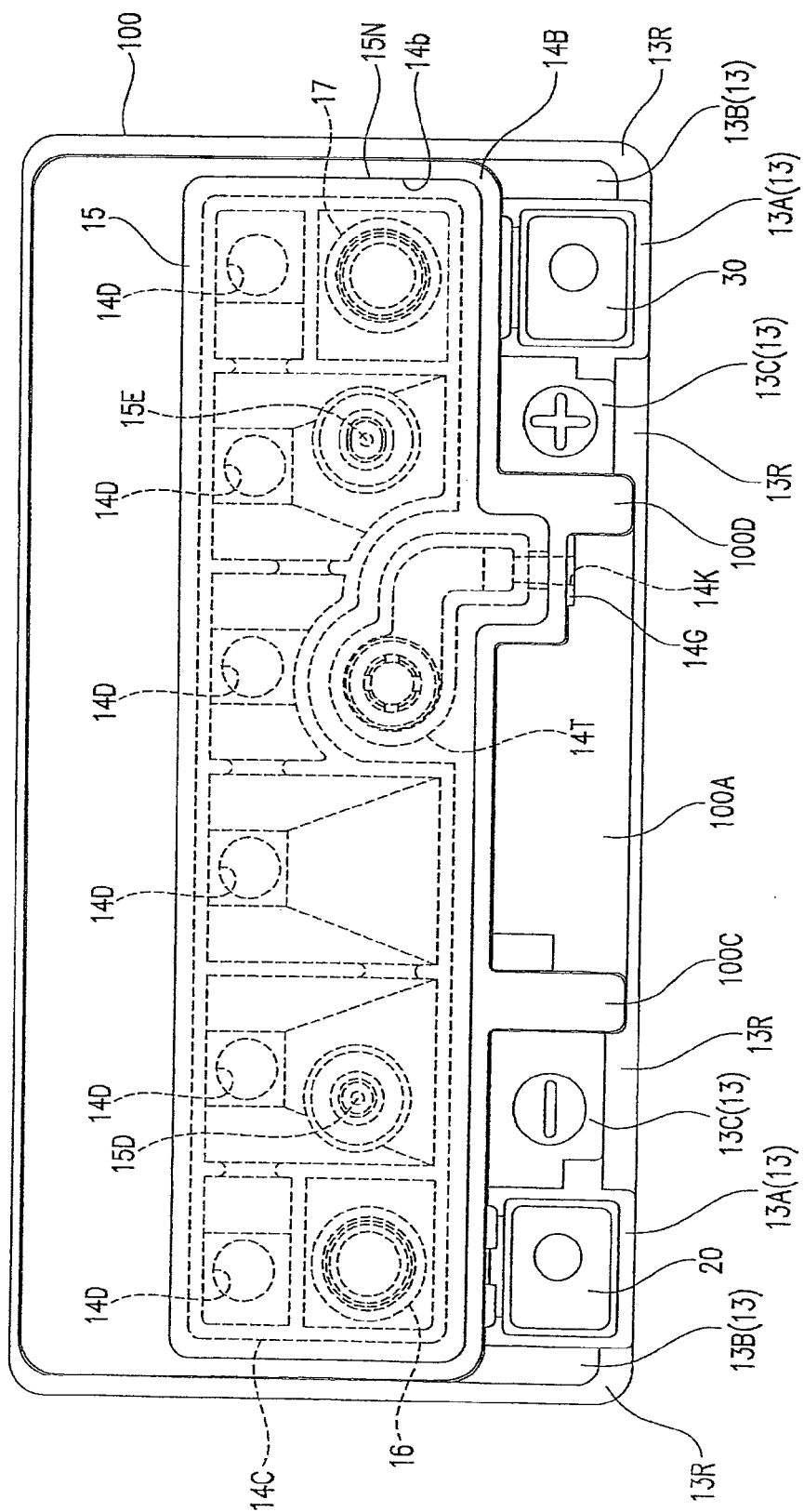
FIG. 10 is a plane view of a storage battery with a lid body cover attached thereto, according to a first embodiment.
Figure 11:
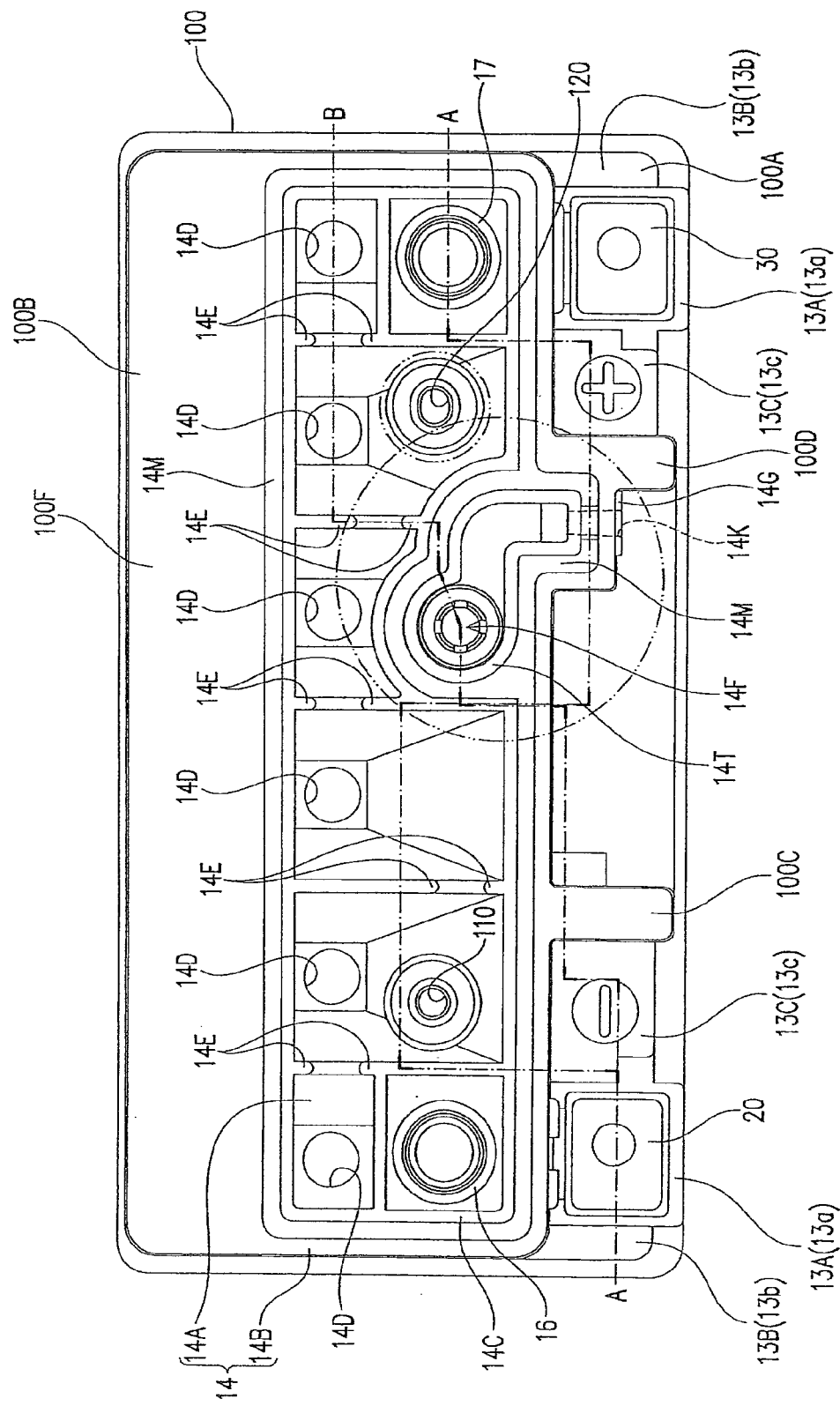
FIG. 11 is a plane view of a lid body before the lid body cover of FIG. 10 is attached.

FIGS. 10 and 11 show a lid body 100 for a lead-acid storage battery of the first embodiment. The basic structure of the lead-acid storage battery of the first embodiment is the same as that of the storage battery 10 shown in FIGS. 1-3, and its features lie in the lid body 100, which corresponds to the lid 2 in FIGS. 1-3. FIG. 10 shows a state after a later described lid body cover 15 is attached to the lid body. The lid body cover 15 corresponds to the auxiliary lid 9 in FIGS. 1-3. FIG. 11 shows a state before the later described body cover lid 15 is attached to the lid body. The lid body 100 is made of synthetic resin and formed into a rectangular shape as viewed in plane, and covers a top opening of the container (corresponding to the container 1 in FIGS. 1-3) having a cell chamber partitioned into plural sections. While the lead-acid storage battery having the lid body 100 (corresponding to the storage battery 10 in FIGS. 1-3) is particularly suitable for use in vehicles such as motorcycles, it may be used for other purposes. In FIGS. 10 and 11, the longitudinal direction of the lid body 100 is designated as a right and left direction and the direction orthogonal to the longitudinal direction is designated as a front and back direction.

As shown in FIG. 11, the lid body 100 includes: a first lid portion 100A having a pair of right and left terminals 20, 30 (corresponding to the terminals 4 in FIGS. 1-3) positioned at both ends, in the longitudinal (right and left) direction, along one of the longitudinal sides (close to the front side in the front and back direction); and a second lid portion 100B having a top surface positioned higher than the top surface of the first lid portion 100A. The top surface of the second lid portion 100B has a recessed portion 14 that is recessed downward.

The recessed portion 14 extends over a broad area of the top surface of the second lid portion 100B, that is, an area extending from the side of the second lid portion 100B adjacent to the first lid portion 100A to a position slightly backward of the middle in the front and back direction. Meanwhile, a flat surface 100F without a recessed portion 14 is provided on the other longitudinal side (which is on the back side in the front and back direction), so as to provide a space that can be used, for example, to place a label indicating a model number or the like. Thus, the flat surface 100F can be used as a space on which a label is placed, allowing a user to write in reference symbols for referencing various data on the label, so as to be able to check data in a step before attaching the lid body cover 15, e.g., data at the time of liquid injection, based on the reference symbols. (Conventionally, such a label is placed on the surface of a lid body cover after attaching the lid body cover, that is, after injecting liquid and attaching the lid body cover, and therefore, even if a label has such reference symbols written thereon, it is impossible to check data at the time of liquid injection based on the reference symbols). In FIG. 11, the left side terminal 20 is a negative electrode terminal and the right side terminal 30 is a positive electrode terminal.

The recessed portion 14 has a bottom wall 14A constituting a bottom portion and a vertical wall 14B standing upright from the outer periphery of the bottom wall 14A. Further, the recessed portion 14 has, in a position inside the vertical wall 14B of the bottom wall 14A, an annular projecting portion 14C that projects upward. The top surface of the projecting portion 14C is positioned lower than the vertical wall 14B, though it may not necessarily be uniform in height across the entire area. As later described, with this structure, when the lower end of joining portions 15C and 15T of the lid body cover 15 is integrated by melting to the projecting portions 14C and 14T of the lid body 100, it is possible to position the top surface of the lid body cover 15 on substantially the same plane as the flat surface 100F of the lid body 100, with the outer periphery 15G of the lid body cover 15 covering the groove 14M.

Figure 12:
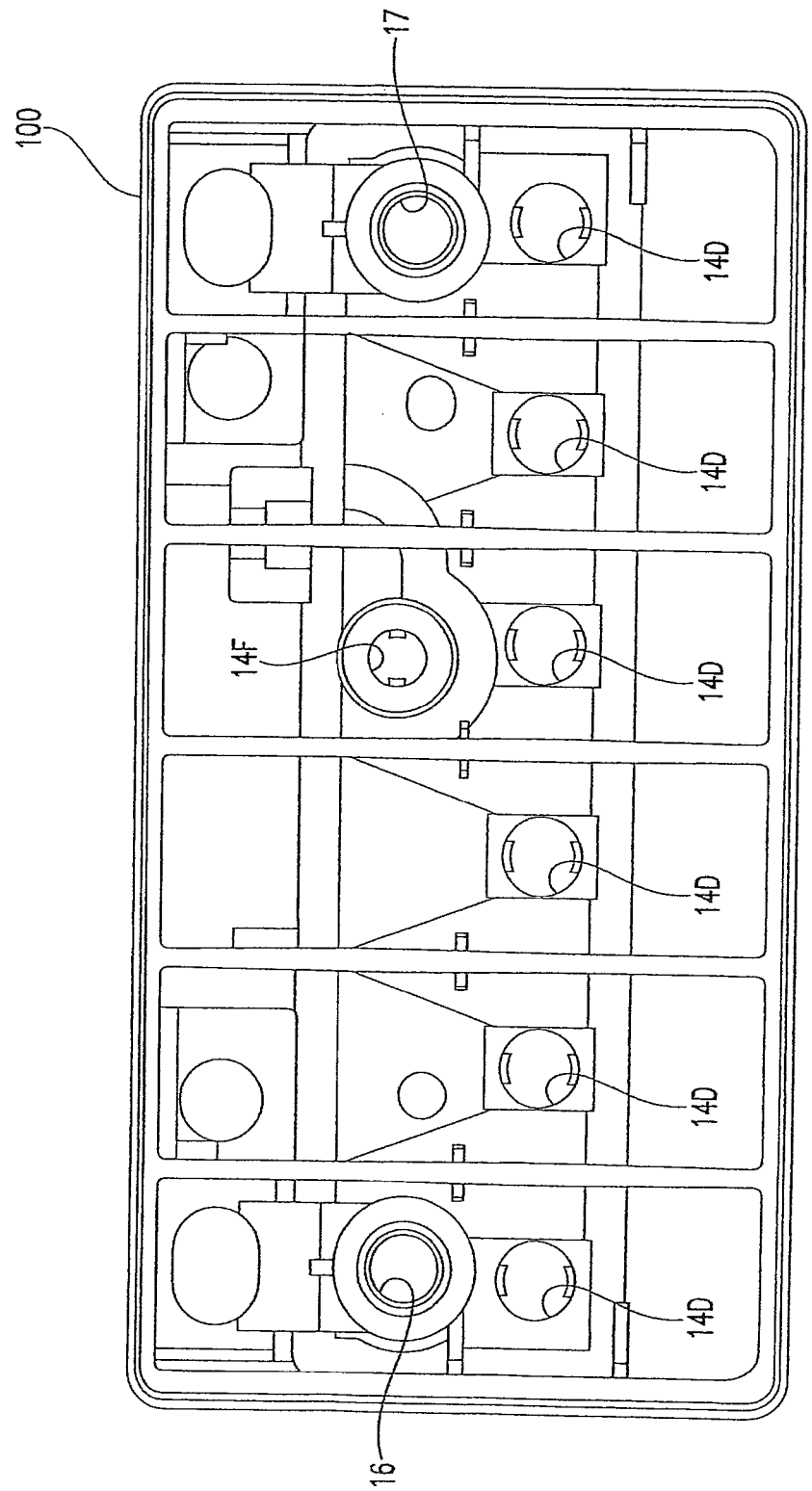
FIG. 12 is a bottom view of the lid body of FIG. 10.

As shown in FIGS. 11 and 12, the recessed portion 14 has exhaust holes 14D in the bottom wall 14A inside the projecting portion 14C for individually exhausting gas from the plural sections of the cell chamber (six sections in the Figures). The number of the exhaust holes may not necessarily be six.

As shown in FIG. 10, FIG. 11 and FIGS. 16(a), 16(b), 16(c) and 16(d), the lid body cover 15 is provided for closing the interior of the projecting portion 14 C, so as to create a space for collecting gas exhausted from the plural exhaust holes 14D toward a specified cell section. As viewed in plane in FIG. 11, the projecting portion 14C is formed in a substantially rectangular shape and has a curved portion that is curved inward so as to bypass a later-described second exhaust hole 14F. The bottom wall 14A is formed to be tilted downward toward each exhaust hole 14D, so as to function as guide surfaces to return electrolyte leaked from the respective exhaust holes 14D to the appropriate exhaust holes 14D. Further, extended portions 14E, 14E extend inward from the oppositely facing portions of the projecting portion 14C to form gaps respectively between the adjacent exhaust holes 14D. This structure ensures only gas exhausted from the exhaust holes 14D freely move inside the projecting portion 14C while inhibiting electrolyte leaked from any of the exhaust holes 14D from moving to the adjacent hole 14D to a possible extent.

Figure 13A:
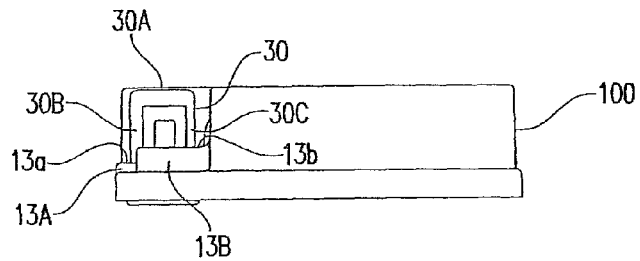
FIG. 13(a) shows a right side view thereof.
Figure 13B:
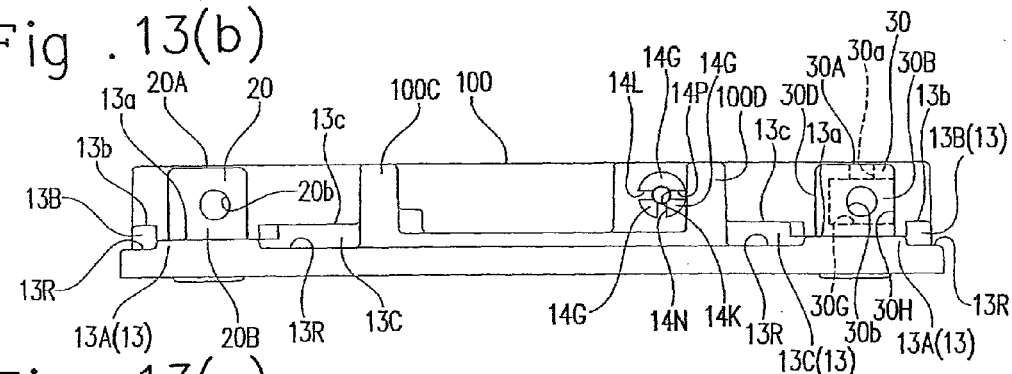
FIG. 13(b) shows a front view thereof.
Figure 13C:
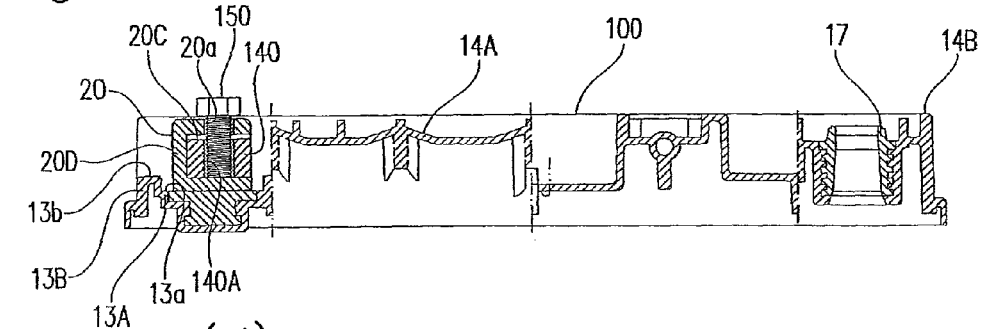
FIG. 13(c) shows a cross sectional view of FIG. 11 taken along line A-A and FIG. 13(d) shows a cross sectional view of FIG. 11 taken along line A-B.

As shown in FIGS. 11, 12 and 13(c), the recessed portion 14 has a pair of right and left tubular bushings 16, 17 (corresponding to the bushing 6 in FIG. 3) embedded therein, and electrode poles for taking out power (not shown) that extend from the container are inserted and welded the bushings 16, 17. The bushings 16, 17 and the lower portions of the terminals 20, 30, which are juxtaposed to the bushings 16, 17 in the horizontal direction, are connected to each other by conductive parts (corresponding to the conductive part 7 in FIG. 3). The terminals 20, 30 and the bushings 16, 17 and the conductive parts are integrally formed by lead or lead alloy to form terminal bodies (corresponding to the terminal body 8 in FIG. 3), with the conductive parts embedded in the lid body 100.

Figure 16A:
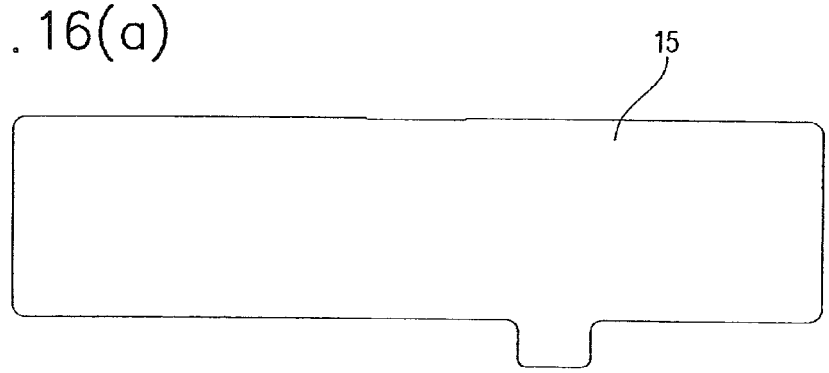
FIG. 16(a) shows a plan view thereof.
Figure 16B:
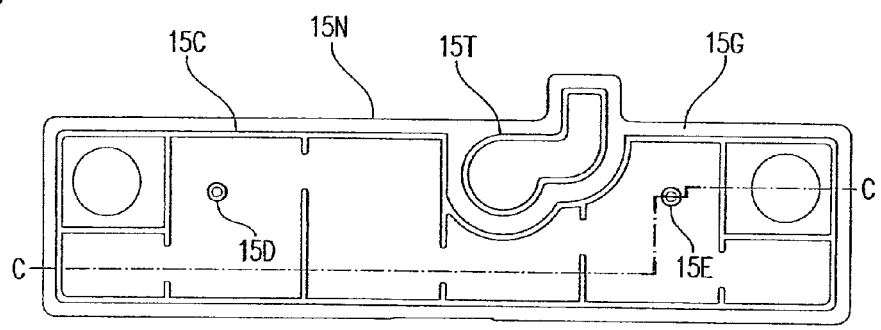
FIG. 16(b) shows a bottom view thereof.
Figure 16C:
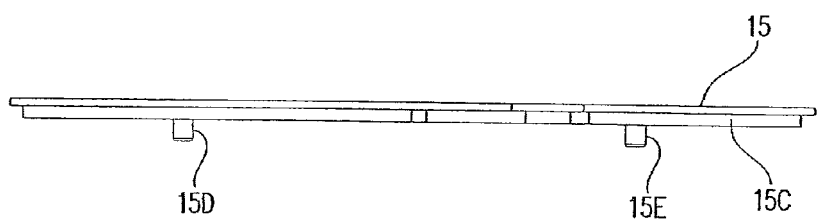
FIG. 16(c) shows a front view thereof and FIG. 16(d) shows a cross sectional view of FIG. 16(b) taken along line C-C.
Figure 16D:
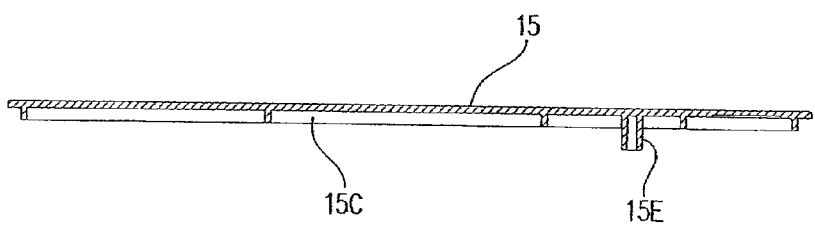

The lid body cover 15 is made of synthetic resin, and, as shown in FIG. 16(b), includes: a joining portion 15C having an outline identical with that of the projecting portion 14 C and being joined to the projecting portion 14C; and an outer peripheral edge 15G covering the annular groove 14 M formed between the projecting portion 14C and the vertical wall 14B. The lower end of the joining portion 15C of the lid body cover 15 is melted, and then fitted to the projecting portion 14C of the recessed portion 14, so that both of them can be integrated together by melting. The joining portion 15C has portions that correspond to the pair of extended portions 14E, 14E that are disposed at five positions of the projecting portion 14C. The joining portion 15C is herein meant to include all of those portions.

As a material of the lid body 100 and the lid body cover 15, a thermoplastic resin such as a polypropylene resin is preferable, but other kinds of synthetic resin may be used. When the lid body cover 15 is thermally bonded to the lid body 100, it is preferable to use the same material for both of them.

To specifically describe the lid body 100, as shown in the FIGS. 10, 11 and FIGS. 13(a) to 13(d), the first lid portion 100A of the lid body 100 has projections 13 provided in locations where the lower portions of the terminals 20, 30 are embedded and the upper portions thereof project. The top surfaces 13a of the projections 13 are positioned higher than the top surface 13R of the first lid portion 100A.

The second lid portion 100B has a pair of extended portions 100C, 100D (corresponding to the recess and projection 2E in FIG. 1) provided at two positions along the longitudinal side of the second lid portion 100B close to the terminals. The pair of extended portions 100C, 100D extend to one side of the lid body 100 (the front side in the front and back direction) and project to the top surface of the first lid portion 100A. The projections 13 are provided at two positions of the first lid portion 100A, each position being surrounded by the pair of extended portions 100C, 100D and portions of the vertical wall 14B of the second lid portion 100B located respectively at the opposite ends along the longitudinal (the right and left direction) side of the lid body 100. The terminals 20, 30 are integrally molded to the tops of the projections 13.

Figure 13D:
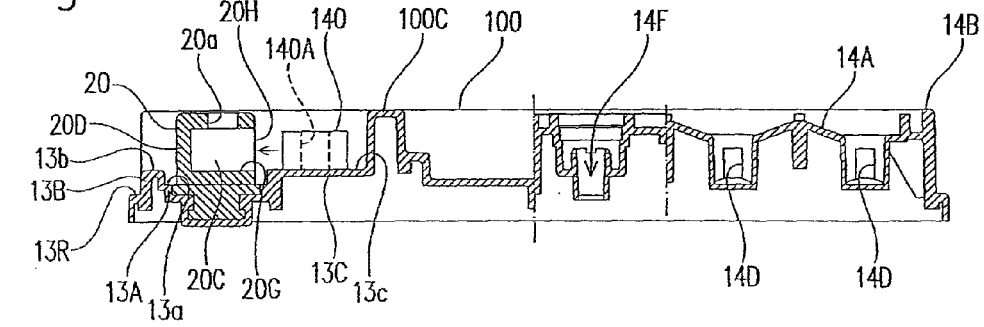

Each of the projections 13 includes: a first projecting portion 13A in which the lower end of the terminal 20 or 30 is embedded; a second projecting portion 13B having a top surface 13b that projects higher than the top surface 13a of the first projecting portion 13A; and a third projecting portion 13C having a top surface 13c that projects higher than the top surface 13a of the first projecting portion 13A, the second and third projecting portions 13B and 13C being located on the opposite sides in the longitudinal direction of the first projecting portion 13A. As shown in FIG. 13(d), the terminal 20 has, in its side end close to the third projecting portion 13C, an opening 20H for inserting a nut 140 and a bottom surface 20G of the opening 20H is positioned lower than the top surface 13c of the third projecting portion 13C. Likewise, the terminal 30 has, in its side end close to the second projecting portion 13B, an opening 30H for inserting a nut and a bottom surface 30G of the opening 30H is positioned lower than the top surface 13b of the second projecting portion 13B. The first projecting portion 13A, the second projecting portion 13B and the third projecting portion 13C are molded to be integrated with the vertical wall 14B of the lid body 100.

Figure 17A:
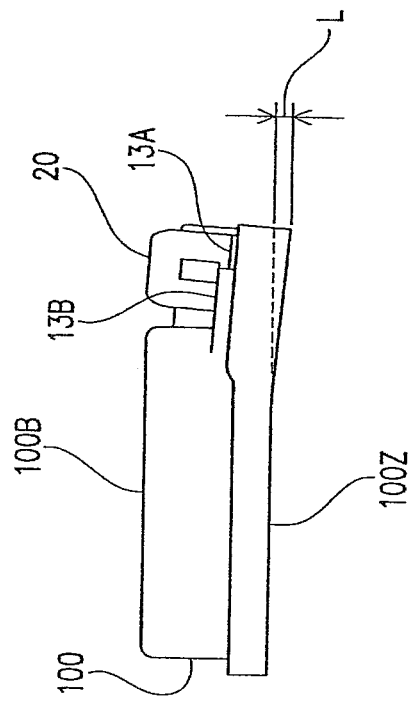
FIG. 17(a) is a left side view of a lid body without a projecting portion and FIG. 17(b) is a left side view of a lid body with projecting portions according to the present invention.
Figure 17B:
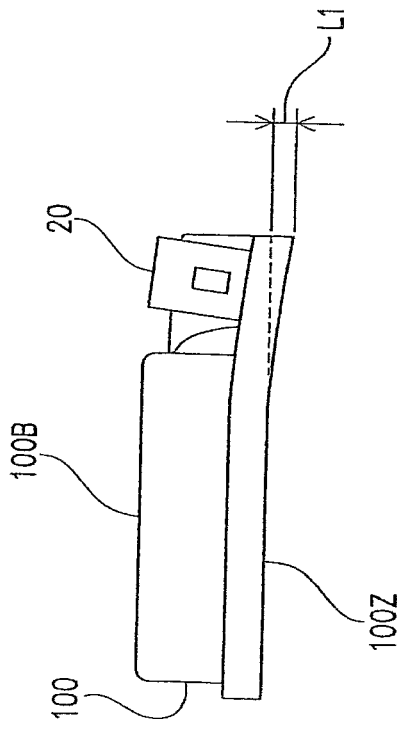

As described above, by providing, in each side, the projecting portions 13A, 13B and 13C at one position in which the lower portion of the terminal 20 or 30 is embedded and its two adjacent positions (its vicinity), it is possible to prevent or reduce convex deformation of the outside of the lid body and concave deformation of the inside of the lid body to a recessed shape. As shown in FIG. 17 (b), in the present invention, in which the terminals 20, 30 are insert molded at the time of molding the lid body 100, a lower end 100Z of the lid body 100 close to the terminal 20 is bent at an angle smaller than the angle shown in FIG. 17(a). Measurement was actually carried out to find a vertical length L1 between the extension line in line with the lower end 100Z on the remote side from the terminal 20 and the extension line of the bent line as shown in FIG. 17 (a), and a vertical length L between the extension line in line with the lower end 100Z on the remote side from the terminal 20 and the extension line of the bent line as shown in FIG. 17 (b). The result was: L was measured as 0.2 mm and L1 was measured as 0.5 mm. This indicates that the lower end 100Z of the lid body 100 close to the terminal 20 is not easily bent because of the first projecting portion 13A provided on the top surface.

Figure 9A:
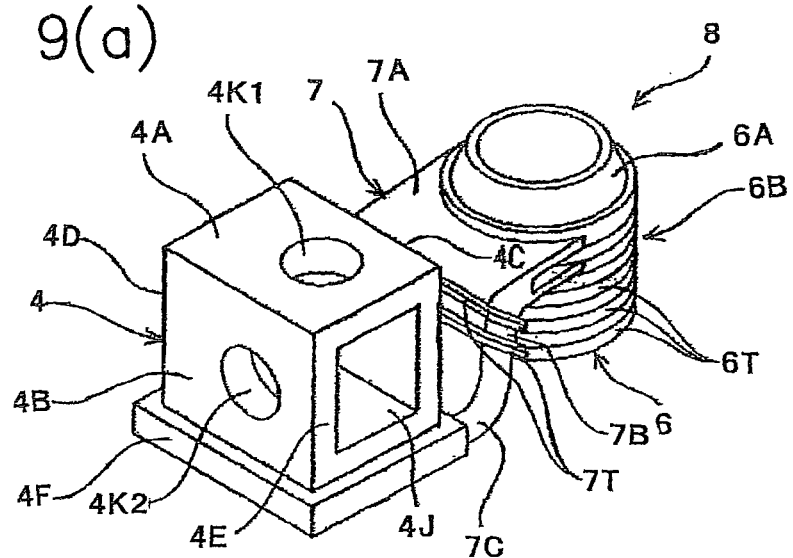
FIG. 9(a) shows a perspective view thereof.
Figure 9B:
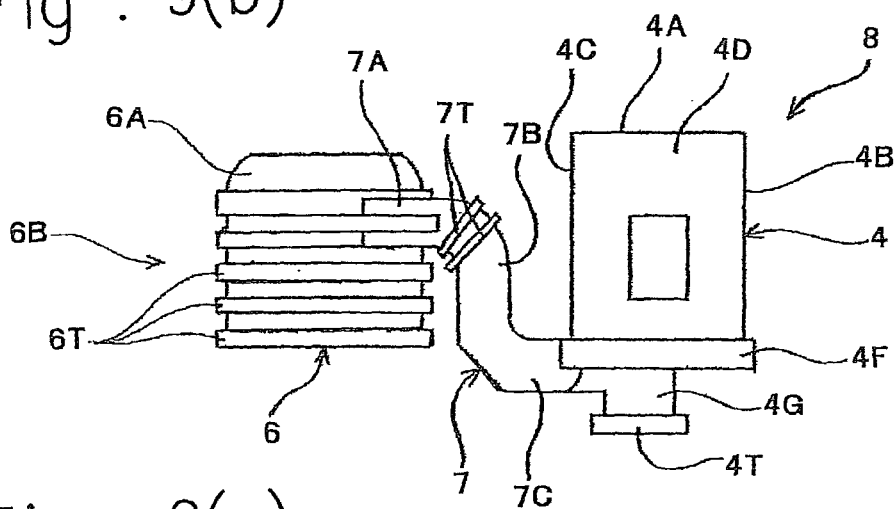
FIG. 9(b) shows a side view thereof and FIG. 9(c) shows a bottom view thereof.
Figure 9C:
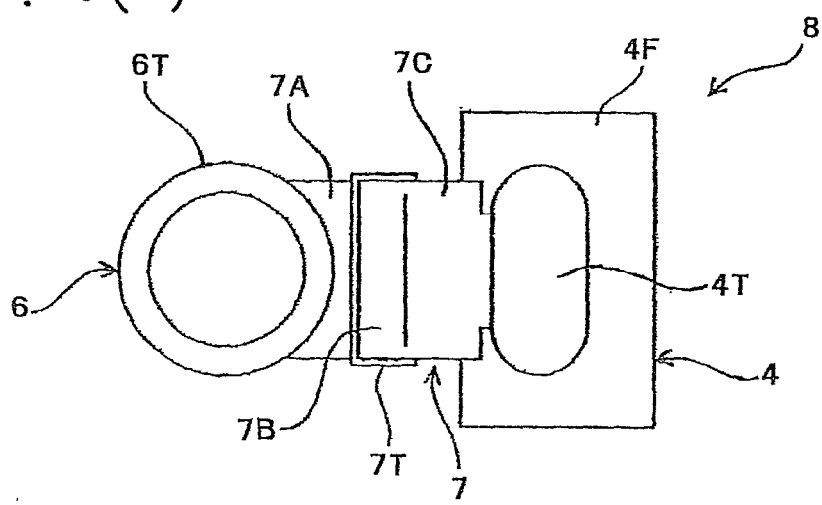

The aforementioned effect of preventing or reducing deformation is now described referring to the storage battery 10 shown in FIGS. 1-3. As shown in FIG. 9 (a), the terminal 4 includes: a rectangular top plate 4A (corresponding to top plates 20A and 30A in FIG. 13(b)); a front plate 4B (corresponding to front plates 20B, 30B in FIG. 13(b)), a rear plate 4C (corresponding to a rear plate 20C in FIG. 13(c) and a rear plate 30C in FIG. 13(a)) and a left plate 4D (corresponding to a left plate 20D in FIG. 13 (c) and a left plate 30D in FIG. 13 (b)) that extend perpendicularly downward, respectively, from three of the four sides of the top plate 4A excepting the right side as viewed from a front side; and a right plate 4E that extends perpendicularly downward from the right side as viewed from a front side. The top plate 4A and the front plate 4B have through-holes 4K1 (corresponding to a through-hole 30*a* in FIG. 13 (*b*) and a through-hole 20*a* in FIG. 13 (*d*)) and 4K2 (corresponding to through-holes 20*b*, 30*b* in FIG. 13(*b*)), respectively, through which a bolt (corresponding to a bolt 150 in FIG. 13 (*c*)) is passed. The right plate 4E (corresponding to the surface where the opening 30H of FIG. 13(*b*) and the opening 20H of FIG. 13(*d*) are provided) has an opening 4J (corresponding to the openings 30H, 20H) for inserting a nut (corresponding to the nut 140 in FIG. 13 (*d*)) into the terminal 4. The through-holes 4K1, 4K2 and the opening 4J are provided in the above manner to ensure that a nut can be inserted from the opening 4J and a bolt with external lead wires for connection to an electrical component of a vehicle can be inserted and passed from one of the through-holes 4K1, 4K2 to be threadingly engaged with the nut, so as to achieve an optimal connection between the storage battery and the external lead wires, in an arrangement where the storage battery is mounted in position in accordance with the connecting positions of the external lead wires. The shape of the terminal 4 as described herein is merely illustrative, and other shapes may be employed.

As shown in FIGS. 13(*a*)-13(*d*), the terminals 20 and 30 include: rectangular top plates 20A, 30A; front plates 20B, 30B, rear plates 20C, 30C and left plates 20D, 30D that extend perpendicularly downward, respectively, from three of the four sides of the top plates 20A, 20B excepting the right side as viewed from the front side. The top plate 20A and the front plate 20B, and the top plate 30A and the front plate 30B have, respectively, through-holes 20*a*, 20*b* and through-holes 30*a*, 30*b* through which the bolts 150 (shown in FIG. 13(*c*)) are respectively passed. As shown in FIG. 13(*c*), the tip end of the bolt 150 inserted from the through-hole 20*a* is threadingly engaged with the nut 140 placed inside the terminal 20, and whereby the nut 140 can be secured to the terminal 20 by the bolt 150. Then, external lead wires or the like (not shown), which are connectable to an electrical component or the like mounted in a vehicle, are held and fixed between the bolt 150 and the nut 140, with the top plate 20A interposed therein. By providing the two pairs of through-holes 20*a* and 20*b*, and 30*a* and 30*b*, it is possible to insert the bolts 150 into the terminals 20, 30 from either one of the top side and the front side of each terminal.

As described above, the terminal 20 or 30 has, in its side end close to the third projecting portion 13C or in its side end close to the second projecting portion 13B, the opening 20H or 30H through which the nut 140 can be inserted, and the bottom surface 20G or 30G of the opening 20H1 or 30H is positioned lower than the top surface 13*c* of the third projecting portion 13C or the top surface 13*b* of the second projecting portion 13B. With this structure, as shown in FIG. 13 (*d*), the nut 140 can be placed on the top surface 13*c* of the third projecting portion 13C to be slid down and inserted into the terminal 20 through the opening 20H thereof. With the arrangement of the bottom surface 20G of the opening 20H of the terminal 20 being lower than the top surface 13*c* of the third projecting portion 13C, the nut 140 inserted into the terminal 20 does not fall off. While FIG. 13(*d*) only shows the left side terminal 20, it is to be noted that the right side terminal 30 has a similar structure. In the Figures, the left and right terminals have the same structure, and thus, the nut 140 is inserted from the right side in either case of the terminal 20 or 30. In addition, the positional relationship between the second projecting portions 13B and the third projecting portions 13C on the left side is opposite in the right and left direction to that on the right side. The top surface 13*b* of the second projecting portion 13B and the top surface 13*c* of the third projecting portion 13C are arranged to be at the same height, but they may be at different heights.

The nut 140 has a rectangular parallelepiped shape. This provides an advantageous effect in that the nut 140 can be brought into surface-to-surface contact with the top surface 13*b* of the second projecting portion 13B or the top surface 13*c* of the third projecting portion 13C, both being flat, while allowing the nut 140 to be stably guided and moved.

FIG. 13(*d*) shows a state before the nut 140 is inserted into the left side terminal 20, and FIG. 13(*c*) shows a state in which the nut 140, after being inserted into the left side terminal 20, is secured inside the terminal 20 with the bolt 150.

As described above, by providing the first projecting portion 13A on the top surface, it is possible to make the lower end 100Z of the lid body 100 rigid against bending on the side of the terminal 20. With this, it is possible to smoothly secure the nut 140 inside the terminal 20 with the bolt 150 after the nut 140 is inserted, for example, into the left side terminal 20.

The second and third projecting portions 13B, 13C are intended to avoid difficulty in inserting a nut, which may be caused by the aforementioned deformation, in the case where a nut is arranged on the top surface to be slid down into the terminal through the opening thereof. Their heights and areas as viewed in plan may be defined with respect to the vertical length L in FIG. 17 (*b*) and not limited to those shown in the Figures. Also, the shapes of these three projecting portions 13A, 13B and 13C may not be limited to those shown in the Figures. Furthermore, not all of the projecting portions 13A, 13B and 13C may necessarily be provided, but at least one of them may be provided to produce the advantageous effects of the present invention.

In FIGS. 10 and 11, only a portion of the wall surface of the longitudinally middle area between the positive and negative electrode terminals of the lid body 100 (the area where the exhaust hole 4K is located) is positioned closer to the front side of the container than the wall surfaces at both longitudinal ends (the areas where the positive and negative terminals are located). On the other hand, in FIG. 18, the entire portion of the wall surface of the longitudinally middle area (the portion extending between the right and left extended portions 100C, 100D) is positioned closer to the front side of the container than the walls at both longitudinal ends (the areas where the positive and negative terminals are provided). This can enhance the advantageous effect of preventing or reducing deformation of the lid body 100.

By employing the structure of FIG. 18 (the sixth embodiment) instead of that of FIGS. 10 and 11, it is possible to enhance the advantageous effect of preventing or reducing deformation of the lid body 100. However, as shown in FIG. 19 (the seventh embodiment), even if the entire portion of the wall surface of the longitudinally middle area is located at the same position as the wall surfaces of both longitudinal ends (the areas where the positive and negative terminals are located) with respect to the front side of the container, by merely providing the first projecting portions 13A, the second projecting portions 13B and the third projecting portions 13C, the advantageous effect of preventing or reducing deformation of the lid body 100 can be achieved. In this case, a guide passage does not include a right and left direction guide portion 19*c*, but only includes a front and back direction guide portion 19*d*. Details of the guide passage will be discussed later.

Now, another effect of preventing or reducing deformation as mentioned above is described referring to the storage battery 10 shown in FIGS. 1-3. To describe the bushing 6 and the electrode pole 5 with reference to FIG. 3, the bushing 6 is of a tapered shape having an inner diameter of the upper portion 6A smaller than that of the lower portion 6B, and the electrode pole 5 is of a tapered shape having an outer diameter of the lower end larger than that of the upper end. This not only allows the electrode pole 5 to be easily inserted into the bushing 6, but prevents misalignment of the electrode pole 5 from easily occurring at the time of insertion. This can make smaller the clearance between the upper portion 6A of the bushing 6 and the electrode pole 5 to thereby increase ease in welding the electrode pole 5 thereto, and can prevent electrolyte from creeping upward to the surface of the electrode pole 5 and moving into the space K from the upper portion 6A of the bushing 6. At this time, the aforementioned effect of preventing or reducing deformation facilitates smooth insertion of the electrode pole 5 into the bushing 6. Further, as shown in FIG. 3, by injecting synthetic resin R into the space K, even if electrolyte moves to the space K through the interface between the lower portion 6B of the bushing 6 and the lid 2, or even if a minute gap is caused in the welding portion B of the electrode pole 5 and the bushing 6, and the electrolyte moves to the space K through the minute gap, it is possible to prevent the electrolyte from leaking outside (to the surface of the auxiliary lid 9, i.e., the outside of the storage battery 10) from the space K through a gap that is caused in melt-bonded portions of the rib 2R and the rib 9R and melt-bonded portions for the arc portion 2r and the arc portion 9r. Injection of the synthetic resin R may be preferably performed before melt-bonding the rib 9R and the rib 2R, or melt-bonding the arc portion 9r and the arc portion 2r, but alternatively, an opening may be provided in a portion of the auxiliary lid 9 corresponding to the space K to allow injection of the synthetic resin R through the opening after the melt-bonding. As the synthetic resin. R, thermosetting resins such as an epoxy resin may be preferably used.

Figure 7:
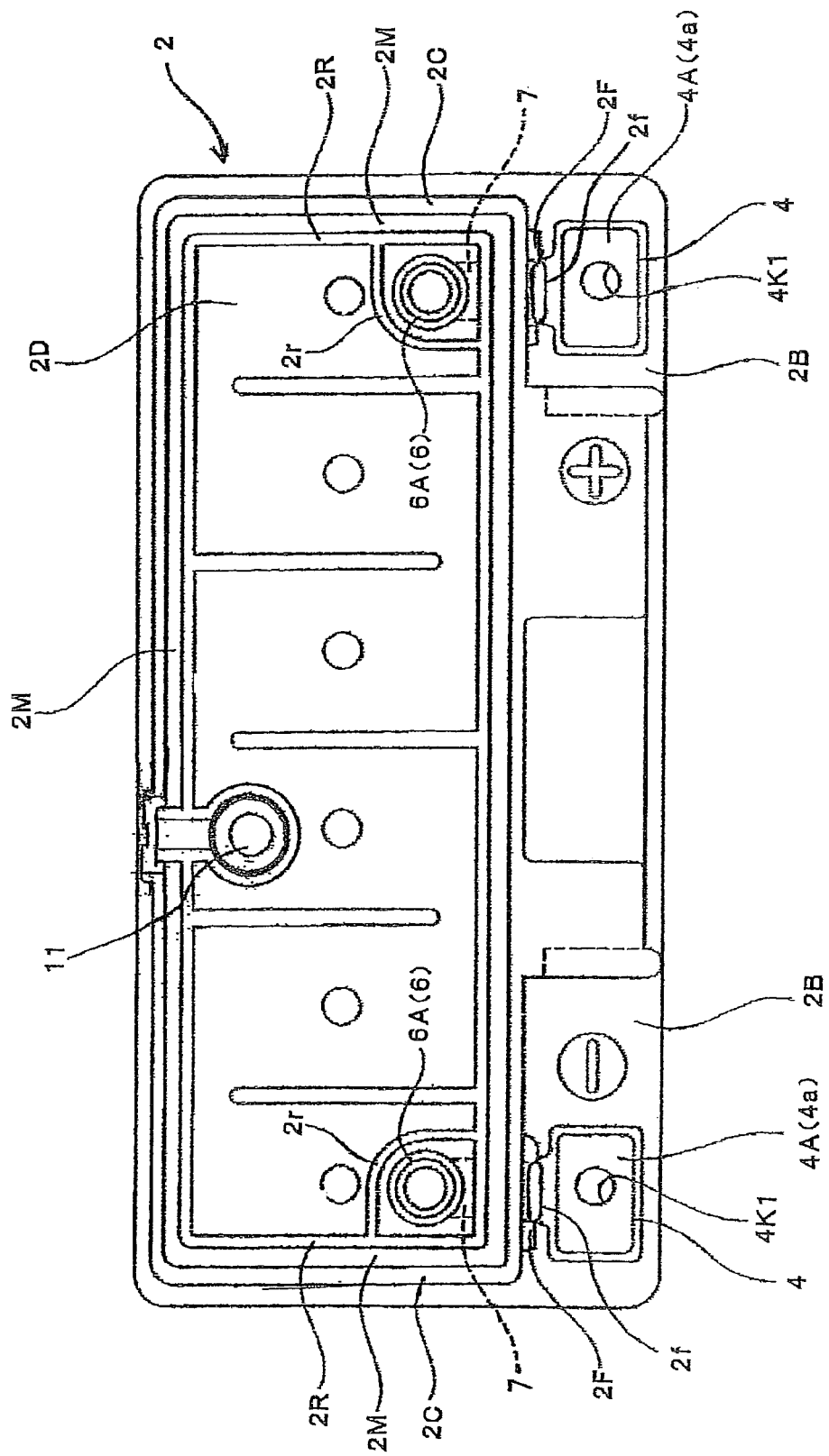
FIG. 7 is a plane view of a storage battery before an auxiliary lid is attached, according to a second embodiment.
Figure 8:
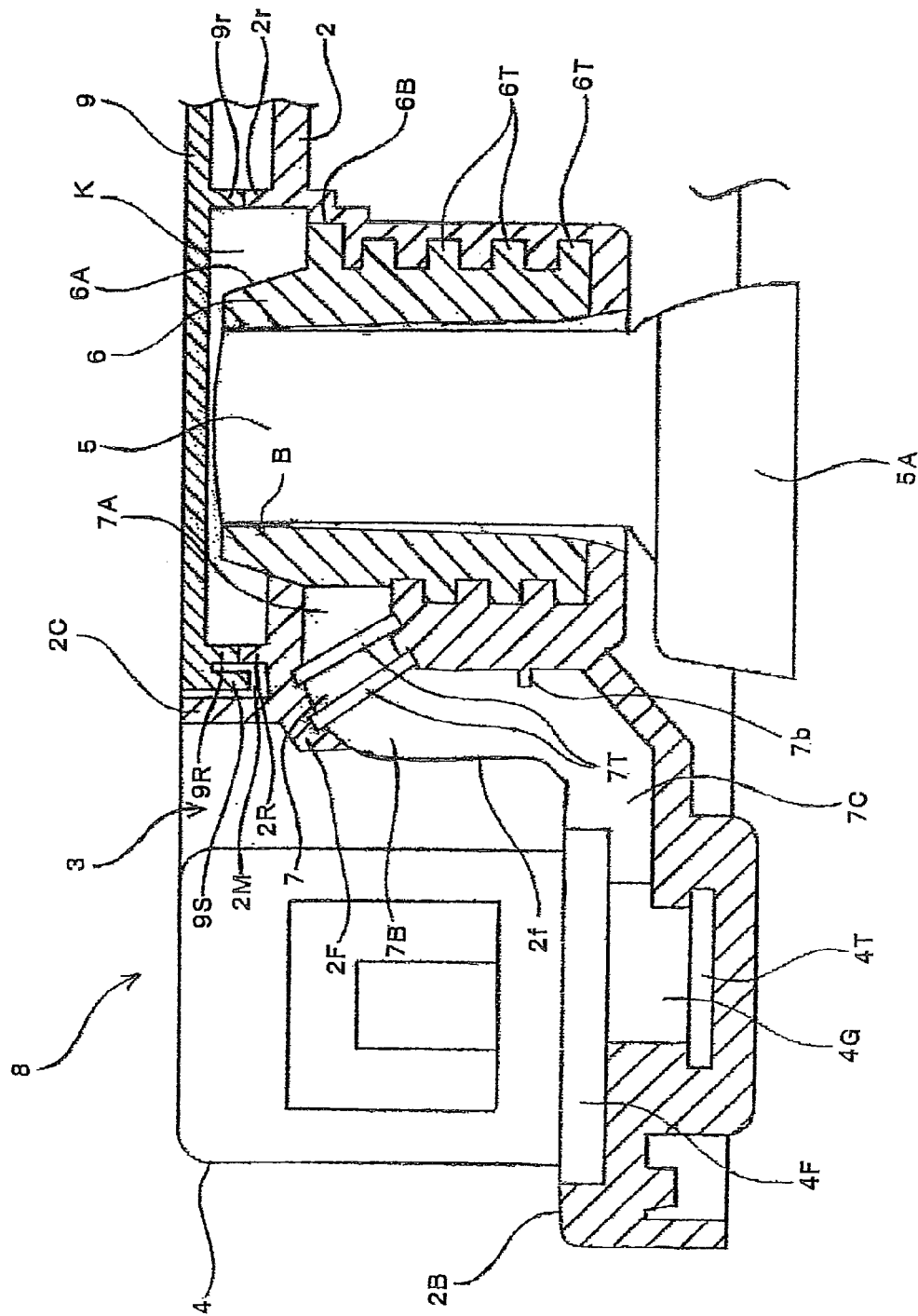
FIG. 8 is a cross sectional view of an essential portion of a terminal body of the storage battery after the auxiliary lid is attached, according to the second embodiment.

The aforementioned effect of preventing or reducing deformation is also achieved as described below (the second embodiment). Specifically, of the terminal body 8, the lower portion 6B of the bushing 6, excluding the upper portion 6A, and the conductive part 7 are embedded in the lid 2 by insert molding. The conductive part 7 includes: a first horizontal plate portion 7A extending in a horizontal direction from the lower portion 6B of the bushing 6; a vertical plate portion 7B extending downward from the end of the first horizontal plate portion 7A; and a second horizontal plate portion 7C extending in a horizontal direction from the lower end of the vertical plate portion 7B to be connected to the bottom portion 4F and the connecting portion 4G of the terminal 4. As shown in FIGS. 7 and 8, the vertical plate portion 7B of the conductive part 7 is configured such that only the top portion thereof is covered with a synthetic resin layer to constitute protruding portions 2F, 2F, which protrude toward the terminals 4, 4 from the vertical plate portion 2C of the lid 2. This is in contrast to FIG. 3, in which the protruding portions 2F, 2F cover the vertical plate portion 7B of the conductive part 7 in its entirety. By having protruding portions 2F, 2F in the vertical plate portion 7B in the presence of a portion 2f that is not covered with a synthetic resin layer as described above, it is possible to promote heat release when a great amount of current is taken out from the storage battery. In addition, when a rapid heat generation occurs due to the flow of a large amount of current, which may be caused by a short-circuit or the like, the presence of the portion 2f allows lead or lead alloy to be eluted outside even if the conductive part 7 is in a softened or molten state, thereby preventing it from flowing down into the storage battery. This results in avoiding problems such as an internal short-circuit in the storage battery. In this manner, when the synthetic resin layer is partly omitted, the portion 2f of the conductive part 7 cools more easily than the remaining portions after insert molding, and thus, the deformation of the lid 2 is reduced as compared to the case where the conductive part 7 is covered with synthetic resin in its entirety.

In FIG. 8, the portion 2f is created by partly omitting the synthetic resin layer, but the portion 2f may have a thin layer of synthetic resin thereon. In this manner, when the synthetic resin layer is partly thinner than in the remaining portions, deformation of the lid body is also reduced as compared to the case where the entire portion of the conductive part 7 is covered with synthetic resin. At this time, the effect of providing the projection 13 is obtained in the same manner as in the case described above.

As a manner to omit a portion of the synthetic resin layer or make a portion of the synthetic resin layer thinner than the remaining portions, it is preferable to avoid injecting synthetic resin into a mold for molding the portion or, if it is injected, to ensure it is done in such a manner as to make the portion thinner. Further, the synthetic resin layer may alternatively be omitted or thinned in the horizontal direction, rather than in the vertical direction as shown in FIG. 8, so as to have an alternative portion 2f. Furthermore, in FIG. 8, the portion 2f is provided on each of the positive and negative electrode sides, but the advantageous effects of the present invention can be obtained by providing the portion 2f on only one of the positive and negative electrode sides.

As shown in FIG. 8, in addition to the portion 2f, the conductive part 7 may be provided with a portion 7b, which is formed by partly making a cross sectional area of the vertical plate portion 7B smaller, so as to allow the constituent material of the conductive part 7 to be eluted outside from the portion 2f, as well as allowing the portion 7b to be molten down to block current flow. While the portion 7b is provided in a lower area of the vertical plate portion B in FIG. 8, it is preferably provided in an upper area of the vertical plate portion 7B to allow molten lead resulting from the melt-down of the portion 7b to fall between the vertical plate portion 7B and the terminal 4. When such a portion 7b is provided, the portion 7b of the conductive part 7 absorbs distortion after insert molding, so as to reduce deformation of the lid 2. The advantageous effect of reducing deformation of the lid 2 at the time of embedding the terminal body 8 into the lid 2 by insert molding is also exerted as described above.

As shown in FIGS. 7 and 8, the creeping distance of the conductive part 7 may be extended by providing the projecting portion 7T on the conductive part 7, but the projection portion 7T may be replaced by an annular depressed portion. Providing a depressed portion rather than the projecting portion 7T can additionally produce the advantageous effects of the aforementioned portion 7b, which is formed by partly making a cross sectional area of the vertical plate portion 7B smaller. Since the portion 7b is intended to block current flow by melting-down, if the portion 7b is provided in the portion 2f of the vertical plate portion 7B where the synthetic resin layer of the protruding portion 2F is not provided, the projecting portion 7T or a depressed portion may preferably be provided separately in the first horizontal plate portion 7A, which is embedded in the synthetic resin layer. The depressed portion may be replaced by a cutout or a recessed portion. By providing a depressed portion, a cutout or a recessed portion as described, it is possible to keep the creeping distance long while at the same time reducing the constituent material of the conductive part 7. When electrolyte that has moved to the first horizontal plate portion 7A further moves to the portion 2f, it may leak out from the portion 2f, and because of this, it is preferable to provide the projecting portion 7T or a depressed portion in the vicinity of the boundary between the first horizontal plate portion 7A and the vertical plate portion 7B to thereby block the movement of the electrolyte at an early stage. In FIG. 8, the projecting portion 7T is provided in the first horizontal plate portion 7A, but the projecting portion 7T may be provided in a top portion of the vertical plate portion 7B within the protruding portion 2F on the condition that the protruding portion 2F is in such a shape as to extend downward from the top portion of the vertical plate portion 7B. Furthermore, in FIG. 8, the projecting portions 7T are provided at two locations, but it may be provided at one or more than two locations. A cutout or a recessed portion may be provided for each of the plural projecting portions 7T, each at a different location in the outer peripheries thereof, so as to keep the creeping distance long while at the same time reducing the constituent material of the conductive part 7. In FIG. 8, the synthetic resin layer is not provided on the top surface of the second horizontal plate portion 7C in such a manner as to be continuous with the portion 2f, but the synthetic resin layer may be provided on the top surface of the second horizontal plate portion 7C.

Figure 4:
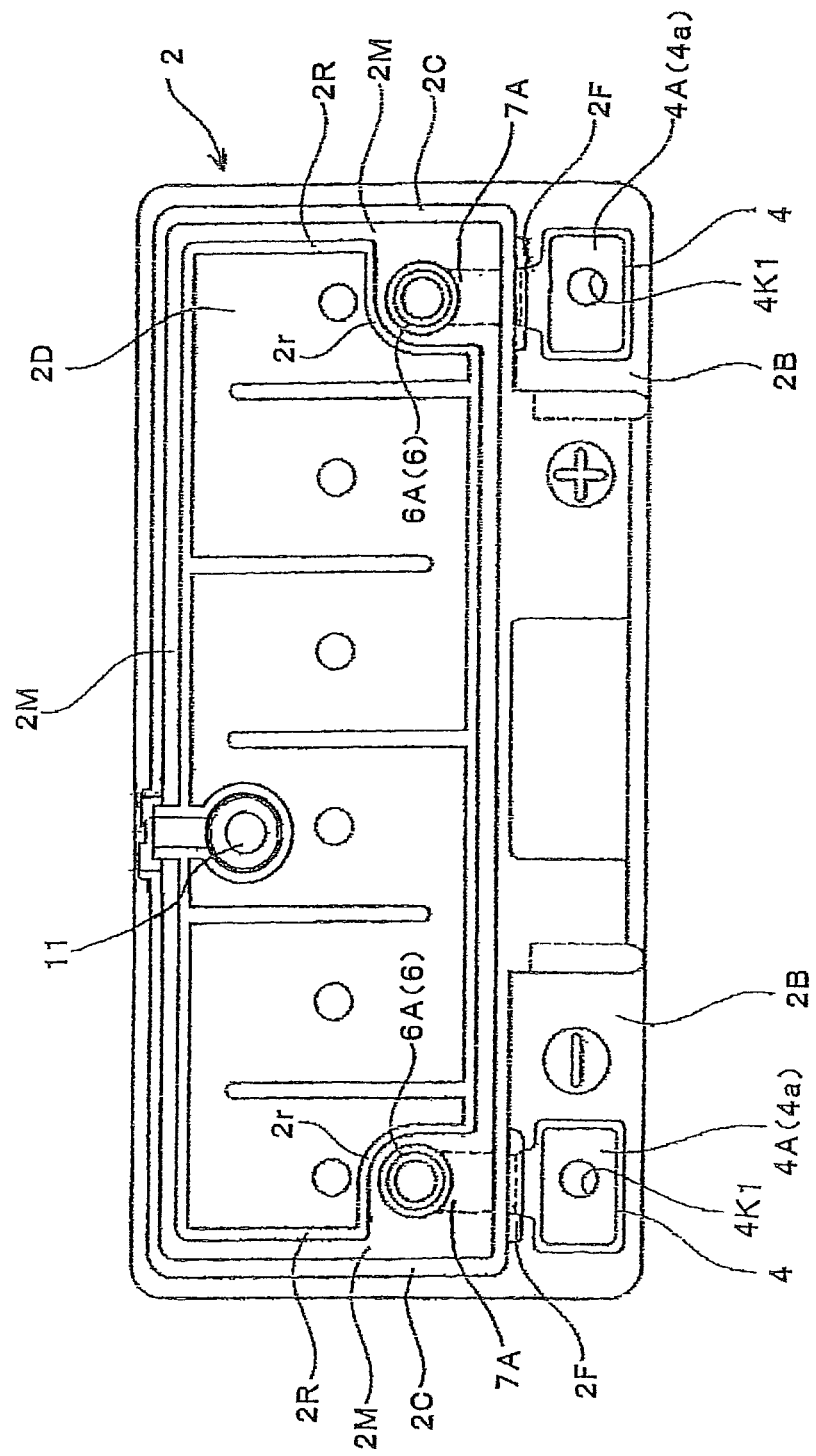
FIG. 4 is a plane view of a storage battery before an auxiliary lid is attached, according to a third embodiment.
Figure 5:
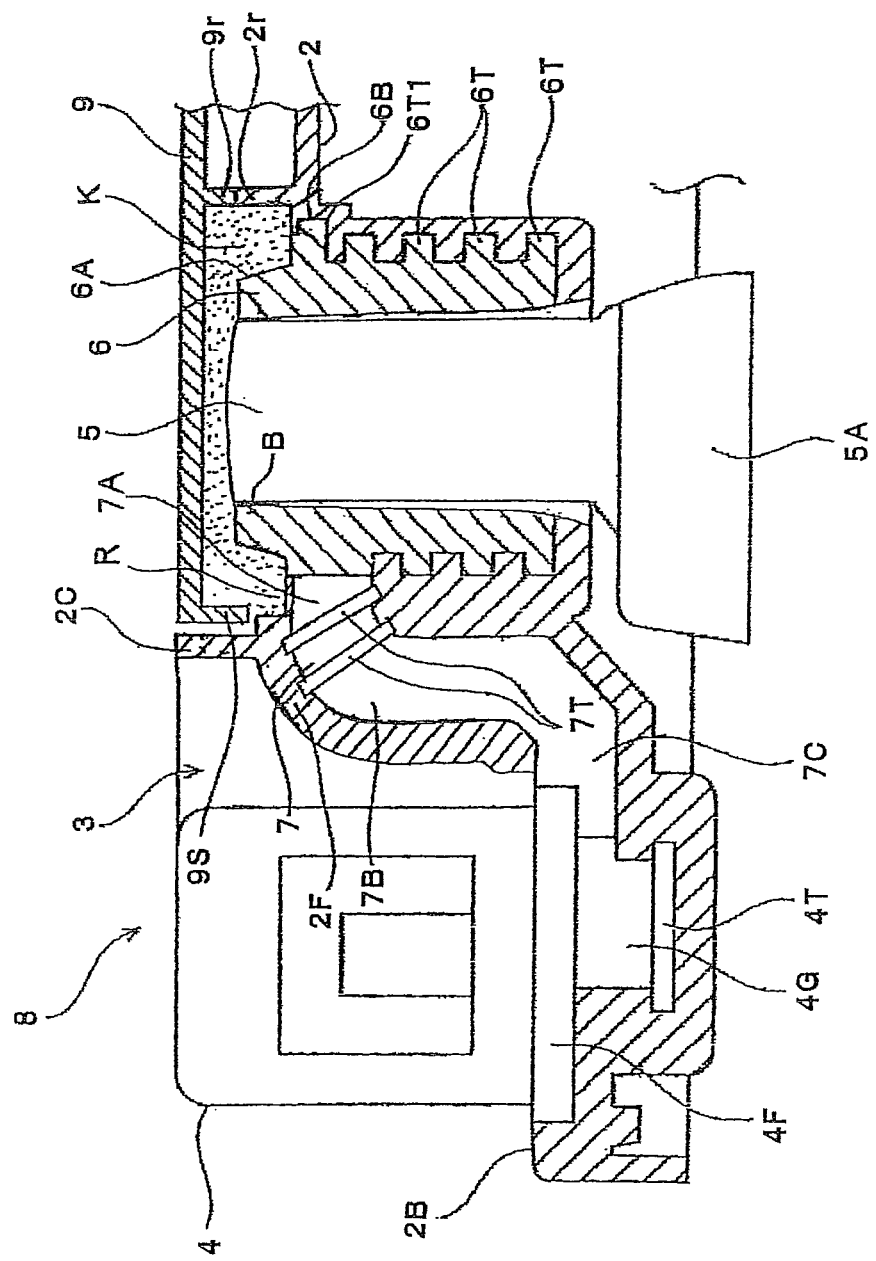
FIG. 5 is a cross sectional view of an essential portion of a terminal body of the storage battery after the auxiliary lid is attached, according to the third embodiment.

Furthermore, as shown in FIGS. 7 and 8, even if electrolyte moves into the space K, it remains in a space surrounded by the ribs 9R and 2R and the arc portions 9r and 2r, and thus it does not leak out to the surface of the auxiliary lid 9, i.e., to the exterior of the storage battery 10. In contrast, the third embodiment, as shown in FIGS. 4 and 5, is characterized in that a portion of the rib 2R is omitted in the area where the arc portion 2r is provided. By omitting a portion of the rib 2R on the side of the vertical plate portion 2C, the surface of the synthetic resin R, which is attached in such a manner as to cover the end of the bushing 6 embedded in the lid, become continuous with the exterior. However, attaching the synthetic resin R in this manner can prevent the electrolyte from moving to the top surface of the lid 2. Depending on the circumstances, the synthetic resin R may not be attached to the upper end of the electrode pole 5 and the upper end of the bushing 6 shown in FIG. 5.

In any of FIGS. 3, 5 and 8, the auxiliary lid 9 wholly covers the synthetic resin R attached to cover the end of the bushing 6 embedded in the lid, an exhaust valve 11 and exhaust holes provided respectively for cells. Alternatively, as shown in FIG. 6, the auxiliary lid 9 may be designed not to cover the area where the synthetic resin R is attached, so as to have the synthetic resin R exposed (the forth embodiment).

In the first to forth embodiments as described above, the plural annular projecting portions 6T of the bushing 6 are provided such that the projecting portion 6T1, the closest to the space K, is formed to have a larger outer diameter than the other projecting portions and part of the projecting portions 6T to be continuous with the first horizontal plate portion 7A of the conductive part 7. This prevents heat generated by welding from transferring to the lid 2 to soften the lid 2.

The surface of the first horizontal plate portion 7A, which is parallel to the top plate 4A of the terminal 4, may not necessarily be horizontal but may be bulged to be in an arc shape or in an oval shape. The surface of the vertical plate portion 7B, which is parallel to the front plate 4B of the terminal 4, and the surface of the second horizontal plate portion 7C, which is parallel to the top plate 4A of the terminal 4 may be configured in the same manner as the surface of the first horizontal plate portion 7A. With the surfaces being bulged as described, insert molding can be reliably performed.

As shown in FIGS. 3, 5, 6 and 8, the terminal body 8 has at its lower end an integrally formed anchor portion 4T for exerting an anchoring effect in insert molding. Alternatively, the anchor portion 4T may be separately formed and integrated to the lower end of the terminal 4 by welding or the like. The anchoring effect is produced by forming the anchor portion 4T such that: the terminal 4 has at its lower end an integrally formed anchor portion 4T; the anchor portion 4T is formed integrally with the lower end of the connecting portion 4G extending downward integrally from the plate-shape bottom portion 4F; and the anchor portion 4T is sized to be larger than the connecting portion 4G as viewed in plan. Specifically, the anchor portion acts to prevent, by its stress, the terminal 4 embedded in the bottom surface 2B of the lid 2 from being pulled out when a bolt with external lead wires is brought into threading engagement with the terminal 4. The anchor portion 4T may preferably have an oval shape as viewed in plan, but not be limited to a particular shape as long as it is sized as described above.

FIG. 9 (*a*) shows a perspective view of the terminal body 8, FIG. 9 (*b*) shows a side view thereof and FIG. 9 (*c*) shows a bottom view thereof. In the Figures, the terminal 4 has at its lower end an integrally formed anchor portion 4T for exerting an anchoring effect in insert molding. Alternatively, the anchor portion may be separately formed and integrated to the lower end of the terminal 4 by welding or the like. The anchor portion 4T is formed integrally with the lower end of the connecting portion 4G extending downward integrally from the plate-shaped bottom portion 4F, which is formed integrally with the lower end of the terminal 4. The anchor portion 4T is sized to be larger than the connecting portion 4G as viewed in plan. In FIGS. 9(*b*) and 9(*c*), the anchor portion 4T has a flat bottom surface. Alternatively, when the terminal body 8 is insert molded with synthetic resin and a mold used for fixing the terminal body 8 has a projecting portion, the anchor portion 4T may have, on its bottom surface, a recessed portion that extends from the center toward the connecting portion 4G, so that the anchor portion 4T and the mold are fitted to each other. Likewise, when a mold used for fixing the terminal body 8 has a recessed portion, the anchor portion 4T may have, on the center of its bottom surface, a conical projecting portion, so that the anchor portion 4T and the mold are fitted to each other. The anchor portion 4T has an oval shape in FIG. 9(*c*), but may have other shapes. Whereby, in the terminal 4, the anchor portion 4T, the conductive part 7 and the bushing 6 can be embedded in the lid, as described above, the lid 2 and the terminal body 8 can be rigidly integrated.

A description is now given for the lid body 100, which is common in the first to fifth embodiments described above (and is referred to as the lid 2 in the second to fifth embodiments). As shown in FIG. 11, the bottom wall 14A has a second exhaust hole 14F. The second exhaust hole 14F may have a porous filter or a valve (not shown) to provide an explosion-proof structure, prevent a backflow of gas from the outside and adjust internal pressure. The second exhaust hole 14F, which is different from the exhaust holes 14D disposed in the bottom walls 14A, is provided in the bottom wall 14A having the forth exhaust hole 14 D from the left in FIG. 11. The cell chamber having the forth exhaust hole 14D (a specific cell chamber) has a guide passage 18 (cf. FIG. 14(*c*)) for collecting, via the forth exhaust hole, gas from other cell chambers and guiding the gas outside from the second exhaust hole. The guide passage 18 is provided in such a manner as to bypass the groove 14M. The guide passage 18 includes: a first guide passage 19 (cf. FIGS. 14 (*a*) and 15), which is formed by joining together the annular joining portion 15T projecting downward from the lower surface of the lid body cover 15 as shown in FIG. 16 (*b*) and the projecting portion 14T projecting from the bottom wall 14A so as to mate with the joining portion 15T as shown in FIG. 11; and a second guide passage 101, which has a tunnel shape and is formed by using portions of the bottom wall 14A, the vertical wall 14B and the projecting portion 14C that form the groove 14M between one end of the first guide passage 19 and a discharge opening 14K.

As shown in FIGS. 14(a), 14(b), 14(c) and FIG. 15, the first guide passage 19 includes: an upward guide portion 19A for guiding gas upward from the second exhaust hole 14F; a horizontal guide portion 19B for guiding gas horizontally from the upward guide portion 19A; and a downward guide portion 19C for guiding gas downward from the horizontal guide portion 19B, thereby transferring gas from the downward guide portion 19C to the second guide passage 101.

The upward guide portion 19A includes: a first upward guide portion 19a having a cylindrical shape for guiding gas upward from the second exhaust hole 14F to a predetermined height; and a second upward guide portion 19b, which has a cylindrical shape and has a larger diameter than the first upward guide portion 19a, for guiding gas further upward from the first upward guide portion 19a. The horizontal guide portion 19B includes: a right and left direction guide portion 19c for guiding gas to one side in the right and left width direction of the lid body 100 (in FIG. 11, to the right); and a front and back direction guide portion 19d for guiding the gas guided to the end of the guide direction of the right and left direction guide portion 19c to one side in the thickness direction of the lid body 100, i.e., the front and back direction orthogonal to the right and left width direction (in FIG. 11, to the downside). The second guide passage 101 includes: the discharge opening 14K formed in the vertical wall 14B by inserting a hole-forming rod into a mold; and a tunnel-shaped through-hole 101A between the vertical wall 14B and the front side wall 19h of the downward guide portion 19C.

Figure 14A:
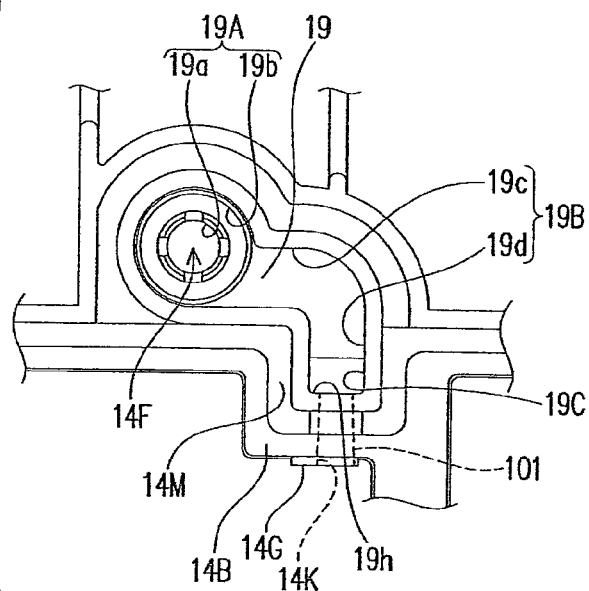
FIG. 14(a) is a plane view showing the periphery of a second exhaust hole.
Figure 14B:
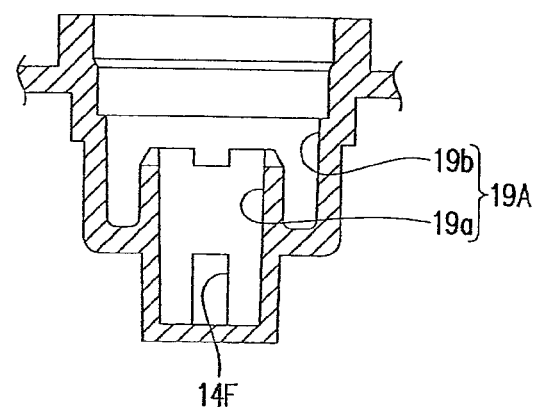
FIG. 14(b) is a vertical cross sectional view of the second exhaust hole.
Figure 14C:
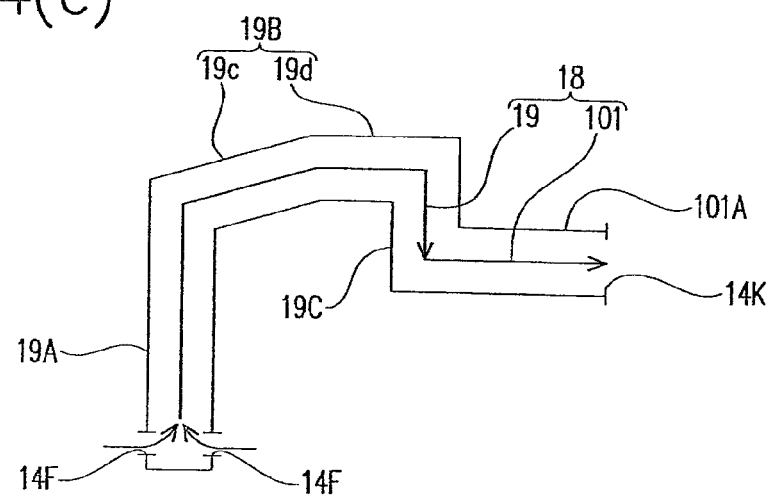
FIG. 14(c) is a schematic view of a guide passage.

According to the structure of the present invention, as shown in FIG. 14(c), electrolyte mist or gas discharged from the second exhaust hole 14F flows through the upward guide portion 19A for upward guiding and through the valve and the porous filter, moves to the horizontal guide portion 19B for horizontal guiding, and then flows through the downward guide portion 19C for downward guiding to be transferred onto the second guide passage 101. Thereafter, the electrolyte mist or gas is discharged outside from the discharge opening 14K. The level of the height of the discharge opening 14K is lower than the level of the height of the lid body cover 15 because of the structure in which the three guide portions 19A, 19B and 19C are provided, each having a different guide direction as described above, and the electrolyte mist or gas reaches the discharge opening 14K via the second guide passage 101, which is advantageous in that gas discharged from the discharge opening 14K does not easily reach the proximity of the terminals 20, 30 from the periphery of the lid body cover 15 or the lid body 100. As described above, the guide passage 18 for guiding gas discharged from the second exhaust hole 14F to the discharge opening 14K is formed in such a manner as to bypass the groove 14M passing through its lower side. This not only allows the level of the height of the discharge opening 14K to be positioned to such a level as not to allow gas to easily reach the proximities of the terminals 20, 30 along the periphery of the lid body cover 15, but also can allow a structure in which there is no connection between the groove 14M and the guide passage 18, and the discharge opening 14K is connected only to the guide passage 18.

With this structure, in a state where the lid body cover 15 is attached and the internal surface 14b of the vertical wall 14B shown in FIG. 10 and the outer periphery surface 15N of the lid body cover 15 are hermetically sealed, pressurized air is supplied into the groove 14M so as to check the joint state, i.e., to detect poor joints between the projecting portion 14T of the lid body 100 that separates the guide passage 18 from the groove 14M and the joining portion 15T of the lid body cover 15, and between the projecting portion 14C of the lid body 100 that separates the aforementioned space from the groove 14M and the joining portion 15C of the lid body cover 15, by checking whether or not there is a pressure decrease in the pressurized air.

Figure 15:
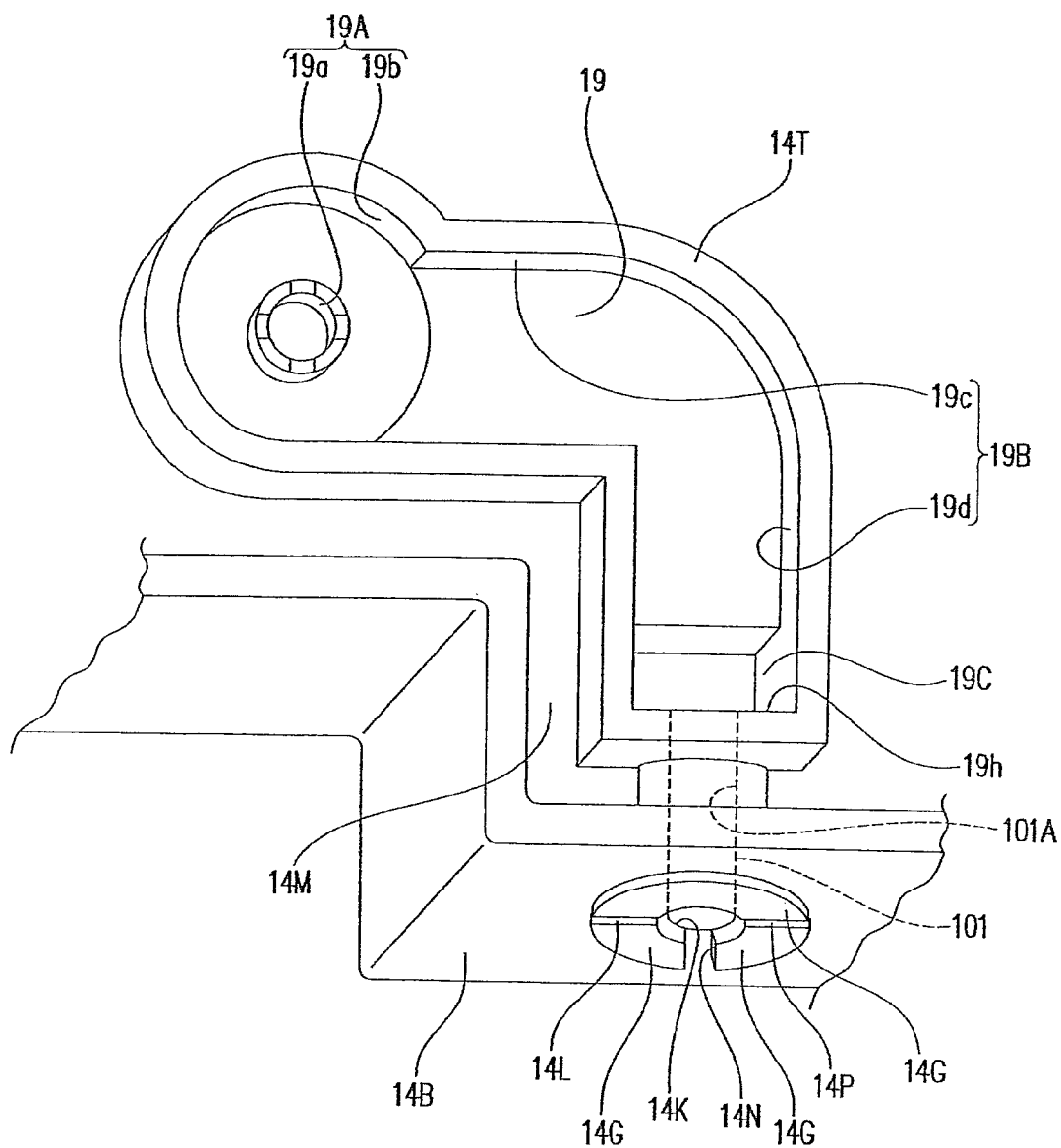
FIG. 15 is a perspective view showing the periphery of the second exhaust hole.

As shown in FIG. 15, the discharge opening 14K includes: an annular and donut-shaped projection 14G projecting from the surface of the vertical wall 14B that constitutes the lid body 100; and three cutouts 14L, 14N and 14P through which gas discharged to a circumferential portion of the projection 14 can be discharged in the radial direction of the projection 14G. The three cutouts include: right and left cutouts 14L and 14P, which are disposed respectively at both sides of the lid body 100 in the right and left direction while passing through the center of the discharge opening 14K; and a lower cutout 14N, which is disposed in such a manner as to extend downward of the lid body 100 from the center of the discharge opening 14K. With this construction, while a cutout extending upward is omitted so as not to cause stagnation of dust, gas can be discharged through the three cutouts 14L, 14N and 14P even in a state where foreign matter is in contact with the surface of the projection 14G. The number, width and the like of the cutouts 14L, 14N and 14P may be freely changed. Instead of having the projection 14G, the surface of the vertical wall 14B may be recessed to have a cutout therein.

For positioning of the lid body 100 and the lid body cover 15 at the time of attachment, one of the lid body 100 and the lid body cover 15 has to-be-locked portions, and the other has locking portions that come into locking engagement with the to-be-locked portions. As shown in FIGS. 16(a)-16(d), the locking portions include a pair of left and right cylindrical portions 15D, 15E projecting downward from the lower surface of the lid body cover 15, the cylindrical portions each having a circular shape in cross section and being hollow inside. Alternatively, the locking portions each may be of a bar-shaped body, being solid inside. As shown in FIG. 11, the to-be-locked portions include a pair of left and right holes 110, 120. Of them, the hole 110 is sized so as to block the horizontal movement of the locking portion 15D that comes into locking engagement with the hole 110, and the hole 120 is shaped into a long hole in an oval shape extending in the direction in which the pair of holes 110 and 120 oppose each other. As described above, before the joining portions 15C, 15T of the lid body cover 15 are joined and integrated with the projecting portions 14C, 14T of the lid body 100 by melting, the pair of locking portions 15D, 15E comes into locking engagement with the pair of holes 110, 120, so that the positioning of the projecting portions 14C, 14T of the lid body 100 and the joining portions 15C, 15T of the lid body cover 15 is completed. In this state, the lid body 100 and the lid body cover 15 are moved close to each other, thereby ensuring reliable joining of the projecting portions 14C, 14T of the lid body 100 and the joining portions 15C, 15T of the lid body cover 15. Even when positioning of the lid body cover 15 and the lid body 100 becomes difficult due to difference in shrinkage, temperature change or change with time after molding or even when the lid body cover 15 expands or shrinks in the longitudinal direction according to room temperature, the hole 120, which is formed into a long hole, absorbs these changes so as to achieve smooth engagement. By providing these to-be-locked portions and the locking portions that come into locking engagement with the to-be-locked portions, the lid body cover 15 and the lid body 100 can be engaged with each other. In addition to this, by providing the projection 13 to prevent deformation as described above, more reliable joining can be achieved.

In the above embodiment, the joining portions 15C, 15T of the lid body cover 15 are melted to be joined and integrated with the projecting portions 14C, 14T of the lid body 100, but alternatively an adhesive may be used to integrate the joining portions 15c, 15T of the lid body cover 15 with the projecting portions 14C, 14T of the lid body 100.

Further, in the above embodiment, the hole 120 is formed into a long hole in an oval shape extending in the direction in which the pair of holes 110 and 120 oppose each other, but alternatively the hole 120 may be of a rectangular shape with its both ends having an angular shape.

Furthermore, in the above embodiment, the lid body cover 15 is of a rectangular shape, but it may be of any shape such as square, oval or circular.

Furthermore, the locking portions are each made up of a bar shaped body, but they may be in any shape as long as they can be in locking engagement with the holes of the to-be-locked portions. For example, the locking portions may be holes and the to-be-locked portions may alternatively be bar-shaped bodies.

Moreover, FIG. 10 and subsequent Figures show a structure in which gas is collected to a particular cell chamber and the guide passage guides the gas to the outside from the cell chamber through the second exhaust hole. Alternatively, the aforementioned space may be used as a guide passage and the second exhaust hole may be omitted.

Moreover, in the above embodiment, the container includes plural cell chambers, but it may include a single cell chamber. In this case, the exhaust hole for discharging from the cell chamber via the guide passage is configured to communicate with the guide passage.

INDUSTRIAL APPLICABILITY

As described in the foregoing, the storage battery according to the present invention is suitable for use in motorcycles. In particular, the storage battery can prevent electrolyte that has moved to the space K from reaching the terminals or the surface of the auxiliary lid (outside of the storage battery), and therefore, the present invention has great industrial applicability.

REFERENCE SYMBOLS

1: container, 2: lid, 2A: upper end, 2B: bottom surface, 2C: vertical plate portion, 2D: top plate, 2E: recess and projection, 2E1: front surface, 2E2: top surface, 2F: protruding portion, 2M: groove, 2R: rib, 2f: portion, 2r: arc portion, 3: cutout, 4: terminal, 4A: top plate, 4B: front plate, 4C: rear plate, 4D: left plate, 4E: right plate, 4F: bottom portion: 4G: connecting portion, 4J: opening, 4K: exhaust hole, 4K1: through-hole, 4T: anchor portion, 5: electrode pole, 5A: strap, 6: bushing, 6A: upper portion, 6B: lower portion, 6T: projecting portion, 6T1: projecting portion, 7: conductive part, 7A: horizontal plate portion, 7B: vertical plate portion, 7C: horizontal plate portion, 7T: horizontal plate portion, 7b: portion, 8: terminal body, 9: auxiliary lid, 9R: rib, 9S: skirt, 9r: arc portion, 10: storage battery, 11: exhaust valve, 13: projection, 13A, 13B, 13C: projecting portion, 13R: top surface, 13a, 13b, 13c: top surface, 14: recessed portion, 14A: bottom wall, 14B: vertical wall, 14C, 14T: projecting portion, 14D: exhaust hole, 14E: extended portion, 14F: exhaust hole, 14G: projection, 14K: discharge opening, 14M: groove, 14b: internal surface, 15: lid body cover, 15C, 15T: joining portion, 15D, 15E: cylindrical portion (locking portion), 15G: outer peripheral edge, 15N: outer periphery surface, 15T: joining portion, 16, 17: bushing, 18, 19: guide passage, 19A, 19B, 19C: guide portion, 19a, 19b: upward guide portion, 19c: right and left direction guide portion, 19d: front and back direction guide portion, 19h: wall, 20, 30: terminal, 20A, 30A: top plate, 20B, 30B: front plate, 20C, 30C: rear plate, 20D, 30D: left plate, 20G, 30G: bottom surface, 20H, 30H: opening, 20a, 20b: through-hole, 100: lid body, 100A, 100B: lid portion, 100C, 100D: extended portion, 100F: flat surface, 100Z: lower end, 101: guide passage, 101A: through-hole, 130: conductive part, 140: nut, 150: bolt, B: welding portion, K: space, R: synthetic resin

The invention claimed is:

1. A storage battery, comprising:
a container having at least one cell chamber;
a lid body made of synthetic resin for covering a top opening of the container, the lid body having on a top surface, a recessed portion that is recessed downward and has a bottom surface on which at least one exhaust hole for communicating with the cell chamber is formed, the lid body having positive and negative electrode terminals disposed close to one side of the lid body and respectively at both end portions of said one side in a longitudinal direction, wherein the positive and negative electrode terminals respectively have lower portions embedded in the lid body and upper portions projecting from the lid body; and
a lid body cover for closing the recessed portion to form a space,
wherein electrode plates are housed in the cell chamber, and the recessed portion of the lid body has bushings to which electrode poles extending from the electrode plates are respectively inserted and welded: and conductive parts respectively connecting the corresponding terminal with the corresponding bushing, the conductive parts each being integrated with the corresponding bushing and the corresponding terminal to form a terminal body, and
wherein the bushings are arranged in the space and the space is separated into a space for collecting gas exhausted from the exhaust hole and a space in which the bushings are arranged,
wherein at least the lower portion of each of the bushings and each of the conductive parts are embedded in the lid body by insert molding, and
wherein the lid body has a projection to prevent the lid body from being convexly deformed to the front side, formed at a location at which the upper portion of each of the terminals projects, at a location proximate to the location at which the upper portion of each of the terminals projects, or at each of these locations.

2. The storage battery according to claim 1, wherein the end of each of the electrode pole welded to the corresponding bushing and the end of each of the bushing embedded in the lid body are covered with synthetic resin.

3. The storage battery according to claim 1, wherein the lid body cover for closing the recessed portion in the top surface of the lid body has a rib on a back surface and the lid body has a rib provided on the top surface of the lid body in such a manner as to oppose the rib of the lid body cover and surround a part or a whole of the periphery of each of the bushings.

4. The storage battery according to claim 1, wherein each of the bushings is of a tapered shape having an inner diameter of the upper portion smaller than that of the lower portion, and each of the electrode poles is of a tapered shape having an outer diameter of the lower end larger than that of the upper end.

5. The storage battery according to claim 1, wherein one of the lid body and the lid body cover has to-be-locked portions and the other has locking portions that come into locking engagement with the to-be-locked portions, the to-be-locked portions comprising a pair of holes, one of the pair of holes being sized to block horizontal movement of the locking portion that comes into locking engagement with the hole, the other of the pair of holes being shaped into a long hole that extends in the direction in which the pair of holes oppose each other.

6. The storage battery according to claim 1, wherein the projection comprises: a first projecting portion disposed in a periphery of the location at which the upper portion of the corresponding terminal projects; and second and third projecting portions disposed in proximity to the first projecting portion, at both sides of the first projecting portion in the longitudinal direction, and projecting upward of the first projecting portion, wherein each of the terminal has, in its side end close to the second projecting portion or in its side end close to the third projecting portion, an opening for inserting a nut, and a bottom surface of the opening is positioned lower than the top surface of the second or third projecting portion.

7. The storage battery according to claim 1, wherein the conductive part of at least one of the terminal bodies has a synthetic resin layer covered thereon, which is formed by insert molding, in such a manner as to be partly omitted or partly thinner than in other portions.

8. The storage battery according to claim 7, wherein each of the conductive parts has at least one of an annular outwardly projecting portion, an annular depressed portion and a portion whose cross sectional area is smaller than the other portions.

9. The storage battery according to claim 1, wherein the lid body cover is configured to close the recessed portion in such a manner as to cover the upper portion of the bushing.

10. The storage battery according to claim 1, wherein the terminals are disposed in cutouts which are formed at the opposite ends of one of the longitudinal sides respectively.

11. The storage battery according to claim 1, wherein the recessed portion of the lid body has a bottom wall constituting a bottom portion and a vertical wall standing upright from an outer periphery of the bottom wall, and the bushing is embedded in the bottom wall.

12. The storage battery according to claim 11, wherein the projection is molded to be integrated with the vertical wall.

* * * * *